US012732597B2

(12) United States Patent
Liu et al.

(10) Patent No.: US 12,732,597 B2
(45) Date of Patent: Sep. 8, 2026

(54) SPATIAL LIGHT MODULATOR, WAVELENGTH SELECTIVE SWITCH, AND PROJECTION SYSTEM

(71) Applicant: HUAWEI TECHNOLOGIES CO., LTD., Shenzhen (CN)

(72) Inventors: Yanzhong Liu, Shenzhen (CN); Rui Guo, Shenzhen (CN); Tenghao Li, Shenzhen (CN); Gen Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 55 days.

(21) Appl. No.: 18/775,150

(22) Filed: Jul. 17, 2024

(65) Prior Publication Data

US 2024/0406356 A1 Dec. 5, 2024

Related U.S. Application Data

(63) Continuation of application No. PCT/CN2022/141703, filed on Dec. 24, 2022.

(30) Foreign Application Priority Data

Jan. 19, 2022 (CN) ........................ 202210062714.X

(51) Int. Cl.
*H04N 9/31* (2006.01)

(52) U.S. Cl.
CPC ................................ *H04N 9/3129* (2013.01)

(58) Field of Classification Search
CPC ...... H04N 9/3129; H04N 9/3161; G02B 1/00; G02F 2203/12
See application file for complete search history.

(56) References Cited

U.S. PATENT DOCUMENTS 10,514,573 B2 12/2019 Kuznetsov et al.
11,822,190 B2 * 11/2023 Xu ........................ G02B 1/002
(Continued)

FOREIGN PATENT DOCUMENTS

| | | | |
|---|---|---|---|
| CN | 113156585 | A | 7/2021 |
| KR | 20170011945 | A | 2/2017 |
| WO | 2020263174 | A1 | 12/2020 |

OTHER PUBLICATIONS

Li, Shiqiang et al, (2020). Dynamic control of visible light with dielectric nanoantennas: towards next-gen spatial light modulators (Conference Presentation). doi: 10.1117/12.2547188.

*Primary Examiner* — Nathanael R Briggs
(74) *Attorney, Agent, or Firm* — WOMBLE BOND DICKINSON (US) LLP

(57) ABSTRACT

A spatial light modulator and a projection system are provided. The spatial light modulator includes a substrate layer, a first electrode layer, a first metasurface layer, a phase change material layer, a second electrode layer, and a first flat layer. The first electrode layer and the second electrode layer are respectively disposed on opposite sides of the substrate layer and the first flat layer that are parallel to each other, and the first metasurface layer and the phase change material layer are disposed between the first electrode layer and the second electrode layer. The first metasurface layer includes at least two metasurface units that are sequentially arranged, and a resonance frequency of each metasurface unit corresponds to a preset incident optical wavelength of each metasurface unit. The spatial light modulator performs phase modulation on incident light through the first metasurface layer and the phase change material layer.

20 Claims, 24 Drawing Sheets

(56) References Cited

U.S. PATENT DOCUMENTS

| | | | | |
|---|---|---|---|---|
| 2017/0023803 | A1 * | 1/2017 | Han | G02F 1/015 |
| 2021/0255490 | A1 * | 8/2021 | Ma | G03H 1/2294 |
| 2022/0099977 | A1 * | 3/2022 | Meitav | G02B 27/0093 |

* cited by examiner

Spatial light modulator 100
Z
X
Incident light
Transmission enhancement layer 16
First flat layer 15
Second electrode layer 14
Phase change material layer 13
First metasurface layer 12
First electrode layer 11
Second flat layer 17
Substrate layer 10

SPATIAL LIGHT MODULATOR, WAVELENGTH SELECTIVE SWITCH, AND PROJECTION SYSTEM

CROSS-REFERENCE TO RELATED APPLICATIONS

This application is a continuation of International Application No. PCT/CN2022/141703, filed on Dec. 24, 2022, which claims priority to Chinese Patent Application No. 202210062714.X, filed on Jan. 19, 2022. The disclosures of the aforementioned applications are hereby incorporated by reference in their entireties.

TECHNICAL FIELD

This application relates to the field of optical technologies, and in particular, to a spatial light modulator, a wavelength selective switch, and a projection system.

BACKGROUND

With continuous development of optical technologies, research and application of a spatial light modulator (SLM) are also continuously popularized. The spatial light modulator is an optical element that modulates optical field distribution of an optical wave. The spatial light modulator may change an optical characteristic, for example, an amplitude, intensity, a phase, or a polarization state of optical distribution in space based on an input control signal. The spatial light modulator can implement real-time optical modulation in space, and has advantages such as high precision, a low drive voltage, and high sensitivity. Therefore, the spatial light modulator has gradually become a key component in optical systems such as photon computing and optical information processing. Therefore, requirements of people on performance of the spatial light modulator also continuously increase.

A multi-layer stacked structure is usually used for an existing phase-type spatial light modulator, and may include a transmission enhancement layer, a flat layer, a liquid crystal layer, an electrode layer, and a substrate layer. The phase-type spatial light modulator mainly performs phase modulation on an incident optical wave through the liquid crystal layer, to implement a function of modulating spatial light. However, because the liquid crystal layer reflects incident light of different wavelengths at different efficiency, unnecessary intensity modulation is easily introduced during phase modulation, and crosstalk between emitted light of different wavelengths of the phase-type spatial light modulator is large. Therefore, how to avoid unbalanced modulation performance of the spatial light modulator for the incident light of different wavelengths has become one of problems to be urgently resolved.

SUMMARY

To resolve the foregoing problem, this application provides a spatial light modulator, a projection system, and a wavelength selective switch. The spatial light modulator provided in this application can be used to resolve a problem of unbalanced modulation performance of the spatial light modulator for incident light of different wavelengths. Performance such as efficiency and a modulation depth of a wide-spectrum device can be ensured while a drive voltage of the spatial light modulator is reduced and a high refresh rate of the spatial light modulator is ensured, and crosstalk between emitted light of different wavelengths of the spatial light modulator can be reduced or eliminated, so that performance and applicability of the spatial light modulator are improved.

According to a first aspect, an embodiment of this application provides a spatial light modulator. The spatial light modulator includes a substrate layer, a first electrode layer, a first metasurface layer, a phase change material layer, a second electrode layer, and a first flat layer. The substrate layer and the first flat layer are parallel to each other. The first electrode layer and the second electrode layer are respectively disposed on opposite sides of the substrate layer and the first flat layer. The first metasurface layer and the phase change material layer are disposed between the first electrode layer and the second electrode layer. The first metasurface layer includes at least two metasurface units that are sequentially arranged, and a resonance frequency of each of the at least two metasurface units corresponds to a preset incident optical wavelength of each metasurface unit.

During operating in real time, the phase change material layer is configured to perform first phase modulation on incident light of a first wavelength based on a voltage provided by the first electrode layer and the second electrode layer to obtain a first optical wave, and send the first optical wave to a first metasurface unit in the at least two metasurface units. A preset incident optical wavelength of the first metasurface unit is the first wavelength; and the first metasurface unit is configured to perform second phase modulation on the first optical wave to obtain and output a second optical wave.

In an embodiment, the phase change material layer and the first metasurface layer that is designed in a differentiated manner for incident light of different wavelengths are disposed in the spatial light modulator. In an aspect, the first metasurface layer is designed in the differentiated manner, so that the spatial light modulator can perform balanced phase modulation on the incident light of different wavelengths through different metasurface units included in the first metasurface layer. This can effectively resolve a problem of unbalanced modulation performance of the spatial light modulator for the incident light of different wavelengths. In another aspect, joint phase modulation may alternatively be performed on the incident light of different wavelengths through the phase change material layer and the first metasurface layer, so that a phase depth of the spatial light modulator may be further deepened, and a deflection angle range of emitted light of the spatial light modulator is larger.

With reference to the first aspect, in an embodiment, the first metasurface unit includes a plurality of nano-antennas, and each of the plurality of nano-antennas is in a cylindrical shape. When the nano-antenna is a dielectric antenna, a diameter of each nano-antenna is greater than or equal to a quarter of the first wavelength and is less than or equal to twice the first wavelength. When the nano-antenna is a metal antenna, a diameter of each nano-antenna is greater than or equal to one tenth of the first wavelength and is less than or equal to the first wavelength.

In an embodiment, the nano-antenna in the metasurface unit is designed in the cylindrical shape, and a value range of the diameter of the nano-antenna is further designed based on the incident optical wavelength corresponding to the metasurface unit. In this way, association between the resonance frequency of the metasurface unit and the preset incident optical wavelength of the metasurface unit can be effectively ensured, and balanced phase modulation performance of the metasurface units is ensured.

With reference to the first aspect, in an embodiment, the first metasurface unit includes a plurality of nano-antennas, and each of the plurality of nano-antennas is in a cuboid shape. When the nano-antenna is a dielectric antenna, each side length of each nano-antenna is greater than or equal to a quarter of the first wavelength and is less than or equal to twice the first wavelength. When the nano-antenna is a metal antenna, each side length of each nano-antenna is greater than or equal to one tenth of the first wavelength and is less than or equal to the first wavelength.

In an embodiment, the nano-antenna in the metasurface unit is designed in the cuboid shape, and a value range of each side length of the nano-antenna is further designed based on the incident optical wavelength corresponding to the metasurface unit. In an aspect, an orientation of the phase change material layer may be optimized through the design of the cuboid nano-antenna, and in another aspect, association between the resonance frequency of the metasurface unit and the preset incident optical wavelength of the metasurface unit can be effectively ensured, and balanced phase modulation performance of the metasurface units can be ensured.

With reference to the first aspect, in an embodiment, the plurality of nano-antennas are sequentially arranged in a first direction, and a long side of each nano-antenna is parallel to an arrangement direction of the at least two metasurface units. The first direction is perpendicular to the arrangement direction of the at least two metasurface units, and a plane on which the first direction and the arrangement direction of the at least two metasurface units are located is parallel to the first flat layer.

In an embodiment, when the nano-antenna is in the cuboid shape, the plurality of nano-antennas in each metasurface unit may be designed into a structure similar to a reflection grating. In this way, each metasurface unit can still maintain good phase modulation performance when incident light is very narrow, and balanced modulation performance of the spatial light modulator for the incident light of different wavelengths can be ensured.

With reference to the first aspect, in an embodiment, the first metasurface unit includes a plurality of nano-antennas, and each of the plurality of nano-antennas is in an elliptical cylindrical shape. When the nano-antenna is a dielectric antenna, a length of a major axis and a length of a minor axis of a target cross section of each nano-antenna are greater than or equal to a quarter of the first wavelength and less than or equal to twice the first wavelength. When the nano-antenna is a metal antenna, a length of a major axis and a length of a minor axis of a target cross section of each nano-antenna are greater than or equal to one tenth of the first wavelength and less than or equal to the first wavelength. Two bottom faces of each nano-antenna are parallel to the first flat layer, and the target cross section of each nano-antenna is a largest cross section of each nano-antenna in an arrangement direction of the at least two metasurface units.

With reference to the first aspect, in an embodiment, a nano-antenna period corresponding to the first metasurface unit is less than or equal to twice the first wavelength.

With reference to the first aspect, in an embodiment, the first electrode layer is a reflective electrode layer or a transmissive electrode layer.

With reference to the first aspect, in an embodiment, the first metasurface layer is included on a side that is of the phase change material layer and that faces the second electrode layer, and is in contact with the second electrode layer.

Alternatively, the first metasurface layer is included on a side that is of the phase change material layer and that faces the first electrode layer, and is in contact with the first electrode layer.

With reference to the first aspect, in an embodiment, the spatial light modulator further includes a transmission enhancement layer and a second flat layer, the transmission enhancement layer is disposed on a side that is of the first flat layer and that is away from the second electrode layer, and the second flat layer is disposed between the phase change material layer and the first electrode layer.

With reference to the first aspect, in an embodiment, the first metasurface layer is included on a side that is of the second flat layer and that faces the phase change material layer, and is in contact with the phase change material layer.

In an embodiment, the first metasurface layer is disposed in the second flat layer. In this way, impact of the first metasurface layer on a molecular orientation of a material of the phase change material layer can be reduced, and phase change performance of the phase change material layer can be improved.

With reference to the first aspect, in an embodiment, the first metasurface layer is included on a side that is of the phase change material layer and that faces the first electrode layer, and is in contact with the second flat layer. Alternatively, the first metasurface layer is included on a side that is of the phase change material layer and that faces the second electrode layer, and is in contact with the second electrode layer.

With reference to the first aspect, in an embodiment, the second flat layer includes at least two stacked flat sub-layers, and any two adjacent flat sub-layers in the at least two stacked flat sub-layers have different refractive indexes.

With reference to the first aspect, in an embodiment, the at least two metasurface units further include a second metasurface unit, and the first metasurface unit and the second metasurface unit have different widths in the arrangement direction of the at least two metasurface units.

With reference to the first aspect, in an embodiment, the spatial light modulator further includes a wavelength selective layer, and the wavelength selective layer is disposed on a side that is of the phase change material layer and that faces away from the substrate layer. The wavelength selective layer is configured to select the incident light of the first wavelength from incident light of the spatial light modulator, and send the incident light of the first wavelength to a position that is at the phase change material layer and that corresponds to the first metasurface unit.

In an embodiment, the wavelength selective layer is disposed on the side that is of the phase change material layer and that faces away from the substrate layer. In this way, incident light of a wavelength can be sent to a position of the wavelength on the phase change material layer in a centralized manner, to arrive at a metasurface unit corresponding to the wavelength as much as possible. In this way, efficiency of using energy of the incident light by the spatial light modulator can be effectively improved, and power consumption of the spatial light modulator is reduced. In addition, in this way, phase modulation pressure of the metasurface unit may also be reduced, and crosstalk is further reduced.

With reference to the first aspect, in an embodiment, the wavelength selective layer includes a third flat layer and a second metasurface layer that are stacked on each other, and the second metasurface layer includes a plurality of nano-antennas in cuboid shapes.

With reference to the first aspect, in an embodiment, the spatial light modulator further includes an orientation layer, and the orientation layer is disposed on a side that is of the phase change material layer and that faces away from the first metasurface layer, and is in contact with a surface that is of the phase change material layer and that faces away from the first metasurface layer. During actual operating, the orientation layer is configured to control molecular orientation of a material included in the phase change material layer, to ensure phase modulation performance of the phase change material layer.

With reference to the first aspect, in an embodiment, the first electrode layer includes a plurality of first electrodes, the second electrode layer includes a plurality of second electrodes, the plurality of first electrodes and the plurality of second electrodes form a plurality of electrode pairs, and at least one of the plurality of electrode pairs corresponds to one of the at least two metasurface units.

In an embodiment, a plurality of independent electrodes form the electrode layer. In this way, independent power supply can be implemented for different areas of the phase change material layer through the electrode layer, so that a phase modulation depth of the phase change material layer can be deepened, and the phase modulation performance of the phase change material layer is improved.

According to a second aspect, an embodiment of this application further provides a wavelength selective switch. The wavelength selective switch includes a polarization conversion prism, a diffraction grating plate, a reflective lens, a transmitting lens, and the spatial light modulator provided in any one of the first aspect or the optional manners of the first aspect.

During actual operating, the polarization conversion prism, the diffraction grating plate, the reflective lens, and the transmitting lens are jointly configured to convert incident light of the wavelength selective switch into a plurality of third optical waves of different wavelengths, and send the plurality of third optical waves to the spatial light modulator. The spatial light modulator is configured to perform phase modulation on each of the plurality of third optical waves to obtain a plurality of fourth optical waves, and send the plurality of fourth optical waves to the transmitting lens at different deflection angles. The plurality of fourth optical waves sequentially pass through the transmitting lens, the reflective lens, the diffraction grating plate, and the polarization conversion prism, and are propagated to an outside of the wavelength selective switch as emitted light of the wavelength selective switch.

In an embodiment, the spatial light modulator in the first aspect is used to form the wavelength selective switch. Because crosstalk of the spatial light modulator is small and phase modulation performance is stable, wavelength selection precision of the wavelength selective switch can be effectively ensured.

According to a third aspect, an embodiment of this application further provides a projection system. The projection system includes an optical source, a spatial light modulator, a lens, and a screen. The spatial light modulator includes a phase change material layer and a first metasurface layer, the first metasurface layer includes a plurality of pixel units, each of the plurality of pixel units includes a plurality of pixel sub-units, each of the plurality of pixel sub-units includes at least four nano-antennas, and the plurality of pixel sub-units include at least two pixel sub-units of different resonance frequencies.

During operating in real time, the spatial light modulator is configured to process, through the phase change material layer and the plurality of pixel units, a source optical wave provided by the optical source to obtain a plurality of first optical waves, and transmit the plurality of first optical waves to the lens. One pixel unit correspondingly processes one first optical wave, and a color value of the first optical wave corresponding to any pixel unit in the plurality of pixel units is determined by a value of a voltage connected to a partial phase change material layer corresponding to each pixel sub-unit included in the any pixel unit. The lens is configured to perform focus adjustment on the plurality of first optical waves, and transmit the plurality of first optical waves after the focus adjustment to the screen for display.

In an embodiment, the first metasurface layer including the plurality of pixel units is disposed in the spatial light modulator included in the projection system, and the plurality of pixel sub-units of different resonance frequencies are designed in each pixel unit. In this way, the spatial light modulator can implement a better color tuning effect based on the phase change material layer and the first metasurface layer that is designed in a differentiated manner, and improve overall performance of the projection system. In addition, this specially designed spatial light modulator requires a smaller drive voltage and has a faster color tuning speed.

With reference to the second aspect, in an embodiment, the plurality of pixel sub-units include a first pixel sub-unit, and each nano-antenna included in the first pixel sub-unit is in a cylindrical shape. A diameter of each nano-antenna is greater than or equal to 1% of a preset wavelength corresponding to the first pixel sub-unit, and is less than or equal to the preset wavelength. A spacing between any two adjacent nano-antennas in the at least four nano-antennas is greater than or equal to 1% of the preset wavelength, and is less than or equal to the preset wavelength. The preset wavelength corresponds to a resonance frequency of the first pixel sub-unit.

In an embodiment, the nano-antenna in the pixel sub-unit is designed in the cylindrical shape, and the diameter of the nano-antenna and a value range of the spacing between adjacent nano-antennas are further designed based on a wavelength of an optical wave that can pass through the pixel sub-unit. In this way, light filtering performance of the pixel sub-unit can be effectively ensured, color tuning performance of the spatial light modulator can be ensured, and the overall performance of the projection system is improved.

With reference to the second aspect, in an embodiment, the plurality of pixel sub-units include a first pixel sub-unit, and each nano-antenna included in the first pixel sub-unit is in a cuboid shape. Each side length of each nano-antenna is greater than or equal to 1% of a preset wavelength corresponding to the first pixel sub-unit, and is less than or equal to the preset wavelength. A spacing between any two adjacent nano-antennas in the at least four nano-antennas is greater than or equal to 1% of the preset wavelength, and is less than or equal to the preset wavelength. The preset wavelength corresponds to a resonance frequency of the first pixel sub-unit.

In an embodiment, the nano-antenna in the metasurface unit is designed in the cuboid shape, and the preset wavelength of the pixel sub-unit limits a value range of each side length of the nano-antenna, so that the design of the cuboid nano-antenna may optimize an orientation of the phase change material layer, effectively ensure light filtering performance of the pixel sub-unit, and ensure color tuning performance of the spatial light modulator.

With reference to the second aspect, in an embodiment, the spatial light modulator further includes a first flat layer, a first electrode layer, a second electrode layer, and a substrate layer. The substrate layer and the first flat layer are parallel to each other, the first electrode layer and the second electrode layer are respectively disposed on opposite sides of the substrate layer and the first flat layer, the first metasurface layer and the phase change material layer are disposed between the first electrode layer and the second electrode layer, the first electrode layer includes a plurality of first electrodes, the second electrode layer includes a plurality of second electrodes, the plurality of first electrodes and the plurality of second electrodes form a plurality of electrode pairs, and at least one of the plurality of electrode pairs corresponds to one pixel sub-unit.

With reference to the second aspect, in an embodiment, the first metasurface layer is included on a side that is of the phase change material layer and that faces the second electrode layer, and is in contact with the second electrode layer. Alternatively, the first metasurface layer is included on a side that is of the phase change material layer and that faces the first electrode layer, and is in contact with the first electrode layer.

With reference to the second aspect, in an embodiment, the spatial light modulator further includes a transmission enhancement layer and a second flat layer. The transmission enhancement layer is disposed on a side that is of the first flat layer and that is away from the second electrode layer, and the second flat layer is disposed between the phase change material layer and the first electrode layer.

With reference to the second aspect, in an embodiment, the first metasurface layer is included on the side that is of the phase change material layer and that faces the first electrode layer, and is in contact with the second flat layer. Alternatively, the first metasurface layer is included on the side that is of the phase change material layer and that faces the second electrode layer, and is in contact with the second electrode layer.

With reference to the second aspect, in an embodiment, the first metasurface layer is included on a side that is of the second flat layer and that faces the phase change material layer, and is in contact with the phase change material layer.

In an embodiment, the first metasurface layer is disposed in the second flat layer. In this way, impact of the first metasurface layer on a molecular orientation of a material of the phase change material layer can be reduced, and phase change performance of the phase change material layer can be improved.

With reference to the second aspect, in an embodiment, the second flat layer includes at least two stacked flat sub-layers, and any two adjacent flat sub-layers in the at least two stacked flat sub-layers have different refractive indexes.

With reference to the second aspect, in an embodiment, the spatial light modulator further includes a wavelength selective layer, and the wavelength selective layer is disposed on a side that is of the phase change material layer and that faces away from the substrate layer. The wavelength selective layer is configured to perform wavelength selection on the source optical wave to obtain and send one or more second optical waves of different wavelengths to the phase change material layer, where a resonance frequency of a pixel sub-unit corresponding to a partial phase change material layer that is of the phase change material layer and on which incidence of each of the one or more second optical waves occurs corresponds to the wavelength of each second optical wave.

In an embodiment, the wavelength selective layer is disposed on the side that is of the phase change material layer and that faces away from the substrate layer. In this way, incident light of a wavelength can be sent to a partial phase change material layer corresponding to the wavelength in a centralized manner, to arrive at a pixel sub-unit through which the optical wave of the wavelength can pass as much as possible. In this way, efficiency of using energy of the source optical wave by the spatial light modulator can be effectively improved, and power consumption of the spatial light modulator is reduced.

With reference to the second aspect, in an embodiment, the spatial light modulator further includes an orientation layer, and the orientation layer is disposed on a side that is of the phase change material layer and that faces away from the first metasurface layer, and is in contact with a surface that is of the phase change material layer and that faces away from the first metasurface layer.

With reference to the second aspect, in an embodiment, the projection system further includes a wavelength selective device, and the wavelength selective device is disposed between the optical source and the spatial light modulator. The wavelength selective device is configured to perform wavelength selection on the source optical wave to obtain and send one or more third optical waves of different wavelengths to the spatial light modulator.

In an embodiment, the wavelength selective device is disposed between the optical source and the spatial light modulator. In this way, incident light of the spatial light modulator may be the third optical wave on which preliminary beam splitting is performed, so that the incident light of the spatial light modulator can arrive at each pixel sub-unit as much as possible. In this way, efficiency of using energy by the spatial light modulator can be effectively improved, and power consumption of the spatial light modulator is reduced. In addition, filtering pressure of each pixel sub-unit may also be reduced.

With reference to the second aspect, in an embodiment, the projection system further includes a polarizer, and the polarizer is disposed between the optical source and the spatial light modulator. The polarizer is configured to perform polarization state adjustment on the source optical wave, and send the source optical wave after the polarization state adjustment to the spatial light modulator.

In an embodiment, the polarizer is disposed at any position between the optical source and the spatial light modulator, so that the polarizer can cooperate with the first metasurface layer, and the spatial light modulator has a high extinction ratio.

With reference to the second aspect, in an embodiment, the projection system further includes an optical splitter, and the optical splitter is disposed between the optical source and the spatial light modulator. The optical splitter is configured to forward the source optical wave to the spatial light modulator. The optical splitter is further configured to send the one or more first optical waves to the lens.

According to embodiments of this application, the problem of unbalanced modulation performance of the spatial light modulator for the incident light of different wavelengths can be effectively resolved, the crosstalk between emitted light of different wavelengths of the spatial light modulator can be reduced or eliminated, and performance and applicability of the spatial light modulator can be improved.

DESCRIPTION OF EMBODIMENTS

The following clearly and describes the technical solutions in embodiments of this application with reference to the accompanying drawings in embodiments of this application. It is clear that the described embodiments are some but not all of embodiments of this application. All other embodiments obtained by one of ordinary skilled in the art based on embodiments of this application without creative efforts shall fall within the protection scope of this application.

With continuous development of optical technologies, an application scope of a spatial light modulator becomes wider. For example, the spatial light modulator is used in common optical systems such as an optical projection system and a wavelength selective switch (WSS). Most existing phase-type spatial light modulators use a stacked structure including a liquid crystal layer. However, because the liquid crystal layer reflects incident light of different wavelengths at different efficiency, unnecessary intensity modulation is easily introduced during phase modulation, and crosstalk between emitted light of different wavelengths of the spatial light modulator is large. This severely affects operating performance of the phase-type spatial light modulator.

Therefore, a technical problem to be resolved in this application is how to avoid unbalanced modulation performance of the spatial light modulator for the incident light of different wavelengths, and improve overall performance and applicability of the spatial light modulator.

To resolve the problem, this application provides a spatial light modulator. The spatial light modulator not only includes a phase change material layer, but also includes a metasurface layer (for ease of differentiation, the following uses a first metasurface layer as a substitute for description) that is designed in a differentiated manner for incident optical waves of different wavelengths. The first metasurface layer includes at least two metasurface units that are sequentially arranged, and a resonance frequency corresponding to each of the at least two metasurface units corresponds to a preset incident optical wavelength of each metasurface unit. The spatial light modulator can perform high-precision joint phase modulation on an incident optical wave based on the phase change material layer and the first metasurface layer. In addition, because the first metasurface layer is designed in the differentiated manner for different incident optical wavelengths, a problem of large crosstalk caused by different reflection efficiency for the incident light of different wavelengths can be effectively resolved, and performance and applicability of the spatial light modulator can be improved.

Embodiment 1

Figure 1:
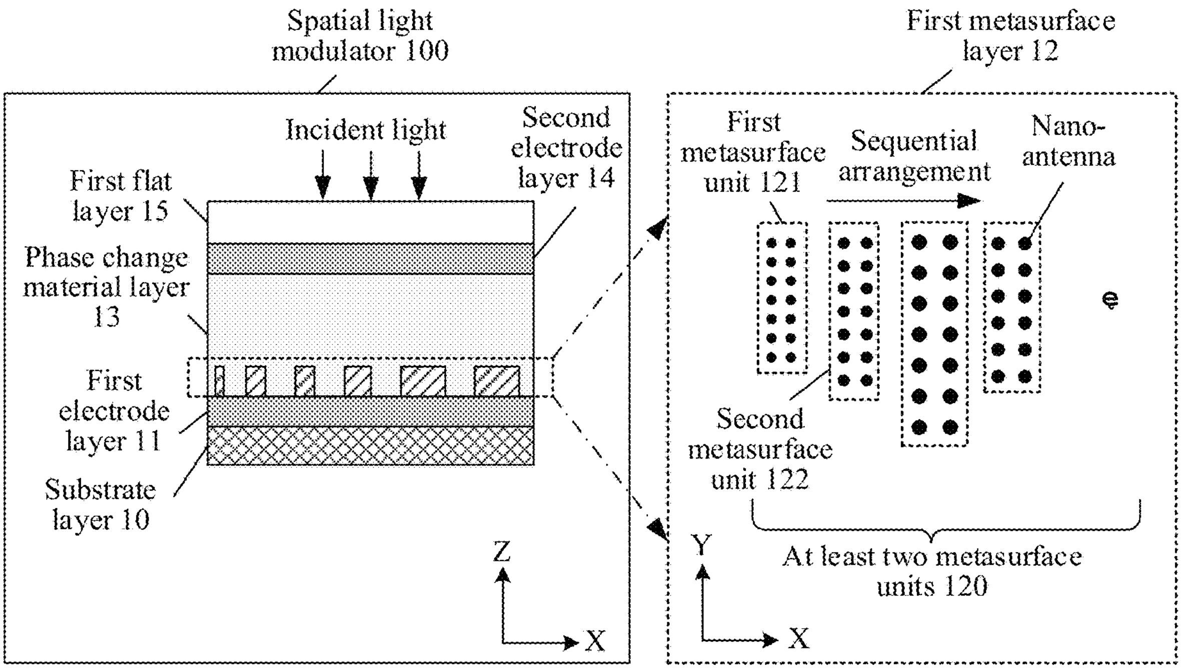
FIG. 1 is a schematic diagram of a structure of a spatial light modulator according to an embodiment of this application.

FIG. 1 is a schematic diagram of a structure of a spatial light modulator according to an embodiment of this application. As shown in FIG. 1, a spatial light modulator 100 may include a substrate layer 10, a first electrode layer 11, a first metasurface layer 12, a phase change material layer 13, a second electrode layer 14, and a first flat layer 15. As shown in FIG. 1, the substrate layer 10, the first electrode layer 11, the first metasurface layer 12, the phase change material layer 13, the second electrode layer 14, and the first flat layer 15 are disposed together in a form of stacking. In an embodiment, the substrate layer 10 and the first flat layer 15 are parallel to each other, and the first electrode layer 11 and the second electrode layer 14 are respectively disposed on opposite sides of the substrate layer 10 and the first flat layer 15. It may also be understood that the first electrode layer 11 is disposed on a side that is of the substrate layer 10 and that faces the first flat layer 15, and the second electrode layer 14 is disposed on a side that is of the first flat layer 15 and that faces the substrate layer 10. The first metasurface layer 12 and the phase change material layer 13 are disposed between the first electrode layer 11 and the second electrode layer 14.

In addition, the first metasurface layer 12 may include at least two metasurface units 120 that are sequentially arranged in a same direction. Resonance frequencies corresponding to the at least two metasurface units 120 are different, and the resonance frequency corresponding to each metasurface unit corresponds to a preset incident optical wavelength of each metasurface unit. For example, a first metasurface unit 121 in the at least two metasurface units 120 is used as an example. Assuming that a preset incident optical wavelength of the first metasurface unit 121 is a first wavelength λ1, a resonance frequency f1 corresponding to the first metasurface unit 121 corresponds to the first wavelength λ1. In an embodiment, assuming that a wave velocity of an optical wave is V, a frequency corresponding to the first wavelength λ1 is V/λ1. In this case, the resonance frequency f1 corresponding to the first metasurface unit 121 may be V/λ1, or the resonance frequency f1 corresponding to the first metasurface unit 121 may be (V/λ1)*p1, where p1 is a preset coefficient. Certainly, a correspondence between the preset incident optical wavelength of the metasurface unit and the resonance frequency of the metasurface unit is merely described herein as an example. In actual implementation, the correspondence may alternatively be another preset correspondence. This is not limited in this application. It should be noted herein that, in actual implementation, actual incident light of some of the at least two metasurface units 120 may not be pure monochromatic light, but be polychromatic light formed by a plurality of beams of monochromatic light of similar wavelengths. In this case, the actual incident optical wavelengths of these metasurface units may be center wavelengths corresponding to the polychromatic light.

During actual operating, after the first electrode layer 11 and the second electrode layer 14 are powered on, a voltage difference exists between the first electrode layer 11 and the second electrode layer 14. In this way, the phase change material layer 13 can have a phase adjustment function under action of the voltage difference. It should be noted herein that a phase modulation degree that can be implemented by the phase change material layer 13 is determined by the voltage difference between the first electrode layer 11 and the second electrode layer 14. Incident light of the spatial light modulator 100 may arrive at the phase change material layer 13 through the first flat layer 15 and the second electrode layer 14. Under action of the voltage difference between the first electrode layer 11 and the second electrode layer 14, the phase change material layer 13 is configured to perform phase modulation on the incident light once (for ease of differentiation, the following uses first phase modulation as a substitute for description), and send an optical wave obtained through the first phase modulation to one of the at least two metasurface units 120. The metasurface unit may be configured to perform phase modulation for a second time on the optical wave obtained through the first phase modulation (for ease of differentiation, the following uses second phase modulation as a substitute for description), to obtain and output the optical wave obtained through the second phase modulation.

It should be additionally noted herein that, in a scenario in which the spatial light modulator 100 is a transmissive spatial light modulator, both the second electrode layer 14 and the first electrode layer 11 may be transmissive electrode layers. The optical wave obtained through the second phase modulation is propagated to an outside of the spatial light modulator 100 through the first electrode layer 11 and the substrate layer 10. When the spatial light modulator 100 is a reflective spatial light modulator, the first electrode layer 11 is a reflective electrode layer. The optical wave obtained through the second phase modulation is reflected by the first electrode layer 11 to the metasurface unit, and the metasurface unit and the phase change material layer 13 perform first phase modulation and second phase modulation again. The optical wave obtained through modulation for a second time is propagated to the outside of the spatial light modulator 100 through the second electrode layer 14 and the first flat layer 15.

The first metasurface unit 121 is still used as an example, and the preset incident optical wavelength of the first metasurface unit 121 is the first wavelength λ1. During actual operating, incident light of the first wavelength λ1 received by the spatial light modulator 100 arrives at the phase change material layer 13 through the first flat layer 15 and the second electrode layer 14. The phase change material layer 13 may be configured to perform first phase modulation on the incident light of the first wavelength λ1 to obtain a first optical wave, and send the first optical wave to the first metasurface unit 121. The first metasurface unit 121 may perform second phase modulation on the first optical wave to obtain and output a second optical wave. Then, when the spatial light modulator 100 is the transmissive spatial light modulator, the second optical wave is propagated to the outside of the spatial light modulator 100 through the first electrode layer 11 and the substrate layer 10. However, when the spatial light modulator 100 is the reflective spatial light modulator, the second optical wave is reflected back from the first electrode layer 11 to the first metasurface unit 121, and the first metasurface unit 121 and the phase change material layer 13 respectively perform second phase modulation and first phase modulation on the second optical wave again to obtain a fifth optical wave. Then, the fifth optical wave is propagated to the outside of the spatial light modulator 100 through the second electrode layer 14 and the first flat layer 15.

In an embodiment, the phase change material layer 13 and the first metasurface layer 12 that is designed in a differentiated manner for incident light of different wavelengths are disposed in the spatial light modulator 100. In an aspect, the first metasurface layer 12 is designed in the differentiated manner, so that the spatial light modulator 100 can perform balanced phase modulation on the incident light of different wavelengths through different metasurface units included in the first metasurface layer 12. This can effectively resolve a problem of unbalanced modulation performance of the spatial light modulator for the incident light of different wavelengths, and improve performance of the spatial light modulator 100. In another aspect, joint phase modulation may alternatively be performed on the incident light of different wavelengths through the phase change material layer 13 and the first metasurface layer 12, so that a phase depth of the spatial light modulator 100 may be further deepened, and a deflection angle range of emitted light of the spatial light modulator 100 is larger.

In addition, because the first metasurface layer 12 designed in the differentiated manner for different incident optical wavelengths is added, a requirement on a refractive index change range of the phase change material layer 13 can be reduced. This reduces a thickness of the phase change material layer, reduces a drive voltage of the spatial light modulator 100, and improves modulation efficiency. Further, because the refractive index of the phase change material layer 13 does not need to be changed in a large range, impact caused by an error caused by a preparation process can be covered, and a preparation process tolerance can be improved. In this case, the manufacturing process tolerance increases, so that component preparation through a low-precision and mature CMOS process can be implemented, and costs of the component preparation can be reduced. In addition, because the refractive index of the phase change material layer 13 does not need to be changed in the large range, a problem of low actual deflection efficiency of a phased array of the phase change material layer 13 may be further alleviated.

To facilitate further description of a spatial structure of the spatial light modulator 100, the following introduces a three-dimensional spatial orientation coordinate system. The spatial orientation coordinate system includes a first direction y, a second direction x, and a third direction z. The second direction x is the direction in which the metasurface units in the at least two metasurface units 120 are sequentially arranged, the first direction y is perpendicular to the second direction x, and a plane on which the first direction y and the second direction x are located is parallel to the first flat layer 15 (or the substrate layer 10). The third direction z is a direction in which layers included in the spatial light modulator 100 are sequentially stacked, and the third direction z is perpendicular to a plane on which the second direction x and the first direction y are located.

Figure 2:
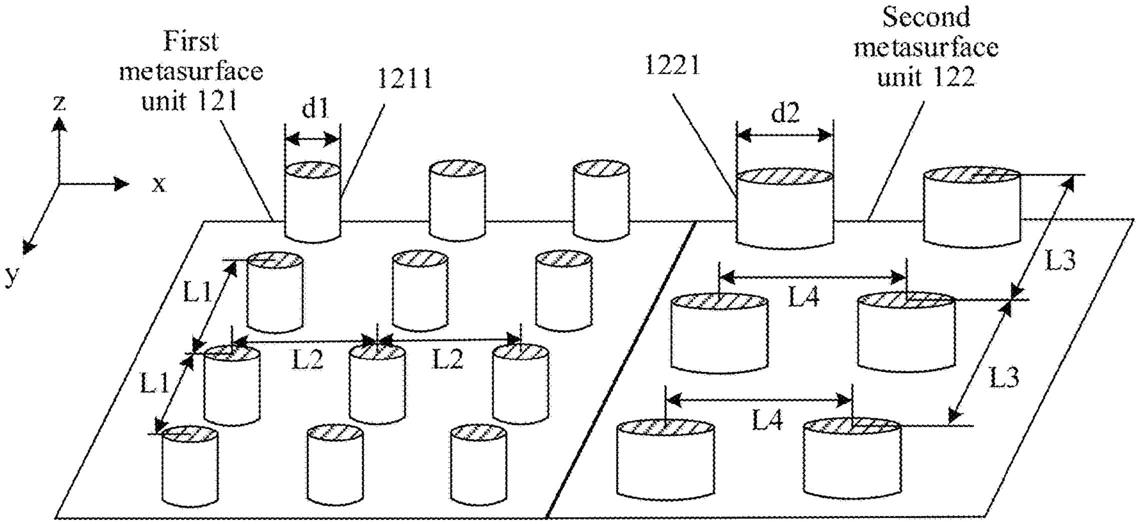
FIG. 2 is a schematic diagram of a structure of a metasurface unit according to an embodiment of this application.

In a feasible implementation, FIG. 2 is a schematic diagram of a structure of a metasurface unit according to an embodiment of this application. As shown in FIG. 2, the first metasurface unit 121 in the first metasurface layer 12 may be formed by uniformly arranging a plurality of nano-antennas, each nano-antenna is in a cylindrical shape, and each nano-antenna has a same size. In an embodiment, when the nano-antenna is a dielectric antenna, a diameter of each nano-antenna in the first metasurface unit 121 may be greater than or equal to a quarter of the first wavelength λ1, and is less than or equal to twice the first wavelength λ1. When the nano-antenna is a metal antenna, a diameter d1 of each nano-antenna may be greater than or equal to one tenth of the first wavelength λ1, and is less than or equal to the first wavelength λ1. For example, a nano-antenna 1211 in the first metasurface unit 121 is used as an example, and it is assumed that a diameter of the nano-antenna 1211 is d1. When the nano-antenna 1211 is the dielectric antenna, a value range of the diameter d1 may be [λ1/4, 2*λ1]. When the nano-antenna 1211 is the metal antenna, the value range of the diameter d1 may be [λ1/10, λ1].

Similarly, as shown in FIG. 2, a second metasurface unit 122 in the first metasurface layer 12 may also be formed by uniformly arranging a plurality of cylindrical nano-antennas of a same size. When the nano-antenna is the dielectric antenna, a diameter of each nano-antenna in the second metasurface unit 122 should also be greater than or equal to a quarter of a preset incident optical wavelength (for ease of description, the following uses a second wavelength λ2 as a substitute for description) of the second metasurface unit 122, and is less than or equal to twice the second wavelength λ2. When the nano-antenna is the metal antenna, a diameter d2 of each nano-antenna may be greater than or equal to one tenth of the second wavelength λ2, and is less than or equal to the second wavelength λ2. A nano-antenna 1221 in the second metasurface unit 122 is used as an example, and it is assumed that a diameter of the nano-antenna 1221 is d2. When the nano-antenna 1221 is the dielectric antenna, a value range of the diameter d2 may be [λ2/4, 2*λ2]. When the nano-antenna 1221 is the metal antenna, the value range of the diameter d2 may be [λ2/10, λ2].

It should be understood herein that the dielectric antenna in an embodiment refers to a nano-antenna made of a low-loss high-frequency dielectric material (such as polystyrene), and may be used to conduct an electromagnetic wave (such as an optical wave). The metal antenna refers to a nano-antenna made of a material, for example, gold, silver, or copper, and may also be used to conduct an electromagnetic wave.

It should be noted that the foregoing describes only structures of the first metasurface unit 121 and the second metasurface unit 122. In actual implementation, a plurality of metasurface units other than the first metasurface unit 121 and the second metasurface unit 122 in the first metasurface layer 12 may use structures similar to the structures of the first metasurface unit 121 and the second metasurface unit 122, or may use structures different from the structures of the first metasurface unit 121 and the second metasurface unit 122, provided that a resonance frequency of each of the plurality of metasurface units is associated with a preset incident optical wavelength of each of the plurality of metasurface units. This is not limited in this application. Certainly, each metasurface unit in the first metasurface layer 12 preferably uses a similar structure.

Further, when the nano-antenna is in a cylindrical shape, an axial direction of each nano-antenna in each metasurface unit may preferably be parallel to the third direction z.

In an embodiment, the nano-antenna in the metasurface unit is designed in the cylindrical shape, and the value range of the diameter of the nano-antenna is further designed based on the incident optical wavelength corresponding to the metasurface unit. In this way, association between the resonance frequency of the metasurface unit and the preset incident optical wavelength of the metasurface unit can be effectively ensured, and balanced phase modulation performance of the metasurface units is ensured.

Figure 3:
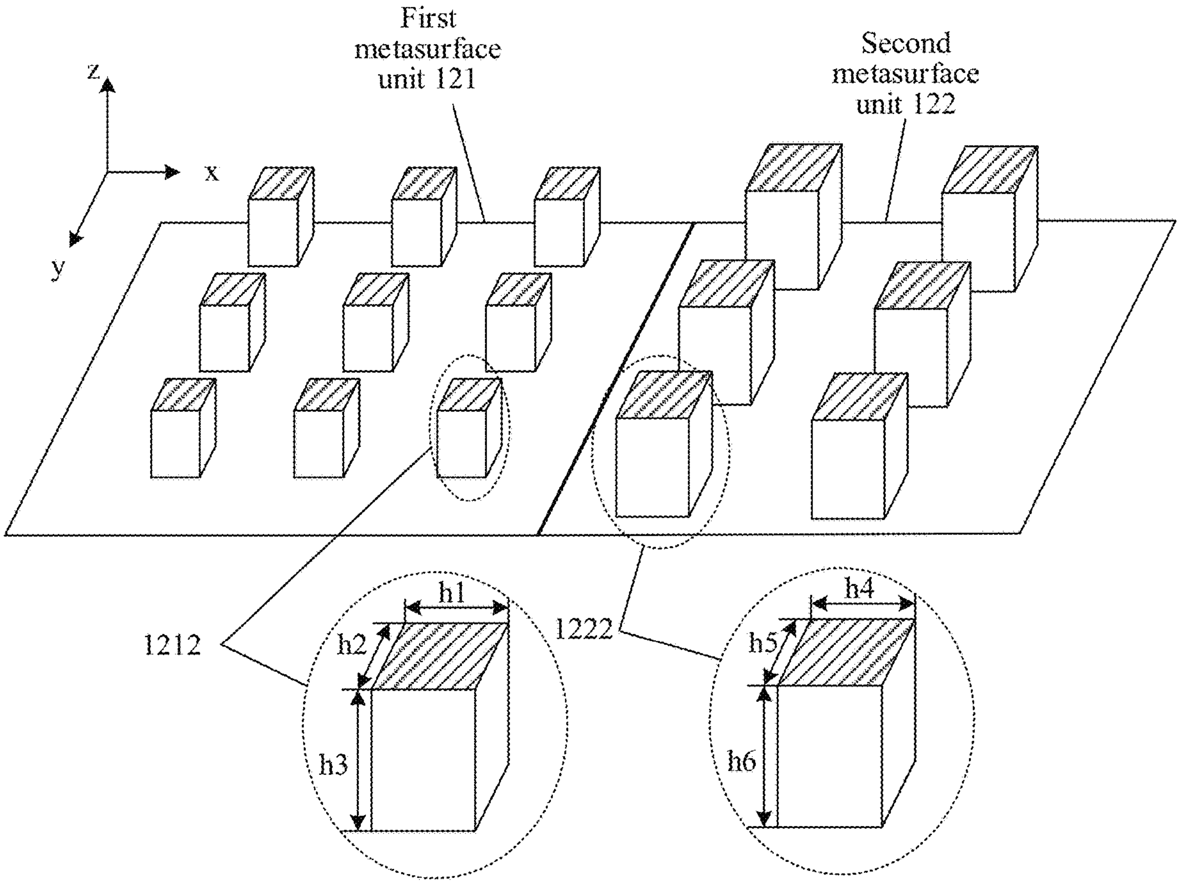
FIG. 3 is another schematic diagram of a structure of a metasurface unit according to an embodiment of this application.

In another feasible implementation, FIG. 3 is another schematic diagram of a structure of a metasurface unit according to an embodiment of this application. As shown in FIG. 3, the first metasurface unit 121 in the foregoing first metasurface layer 12 may be formed by uniformly arranging a plurality of cuboid nano-antennas of a same size. In addition, when the nano-antenna is the dielectric antenna, each side length of each nano-antenna in the first metasurface unit 121 may be greater than or equal to a quarter of the foregoing first wavelength λ1, and is less than or equal to twice the first wavelength λ1. When the nano-antenna is the metal antenna, each side length of each nano-antenna may be greater than or equal to one tenth of the first wavelength λ1, and is less than or equal to the first wavelength λ1. For example, a nano-antenna 1212 in the first metasurface unit 121 is used as an example. Side lengths of the nano-antenna 1212 may include a side length h1 in the second direction x, a side length h2 in the first direction y, and a side length h3 in the third direction z. When each nano-antenna is the dielectric antenna, value ranges of the side length h1, the side length h2, and the side length h3 are all [λ1/4, 2*λ1], that is, λ1/4≤h1≤2*λ1, λ1/4≤h2≤2*λ1, and λ1/4≤h3≤2*λ1. When each nano-antenna is the metal antenna, the value ranges of the side length h1, the side length h2, and the side length h3 of the nano-antenna 1212 are all [λ1/10, 1], that is, λ1/10≤h1≤λ1, λ1/10≤h2≤λ1, and λ1/10≤h3≤λ1.

Similarly, the second metasurface unit 122 in the first metasurface layer 12 may also be formed by uniformly arranging a plurality of cuboid nano-antennas of a same size. In addition, when the nano-antenna is the dielectric antenna, each side length of each nano-antenna in the second metasurface unit 122 may also be greater than or equal to a quarter of the preset second wavelength λ2 of the second metasurface unit 122, and is less than or equal to twice the second wavelength λ2. When the nano-antenna is the metal antenna, each side length of each nano-antenna may be greater than or equal to one tenth of the second wavelength λ2, and is less than or equal to the second wavelength λ2. Herein, a nano-antenna 1222 in the second metasurface unit 122 is used as an example. Side lengths of the nano-antenna 1222 include a side length h4 in the second direction x, a side length h5 in the first direction y, and a side length h6 in the third direction z. When each nano-antenna is the dielectric antenna, value ranges of the side length h4, the side length h5, and the side length h6 of the nano-antenna 1222 are all [λ2/4, 2*λ2], that is, λ2/4≤h4≤2*λ2, λ2/4≤h5≤2*λ2, and λ2/4≤h6≤2*λ2. When each nano-antenna is the metal antenna, the value ranges of the side length h4, the side length h5, and the side length h6 of the nano-antenna 1222 are all [λ2/10, λ2], that is, λ2/10≤h4≤λ2, λ2/10≤h5≤λ2, and λ2/10≤h6≤λ2.

It should be noted that, in actual implementation, a plurality of metasurface units other than the first metasurface unit 121 and the second metasurface unit 122 in the first metasurface layer 12 may use structures similar to structures of the first metasurface unit 121 and the second metasurface unit 122, or may use structures different from the structures of the first metasurface unit 121 and the second metasurface unit 122, provided that a resonance frequency of each of the plurality of metasurface units corresponds to a preset incident optical wavelength of each of the plurality of metasurface units. This is not limited in this application. Each metasurface unit in the first metasurface layer 12 preferably uses a similar structure.

In an embodiment, the nano-antenna in the metasurface unit is designed in the cuboid shape, and the value range of each side length of the nano-antenna is further designed based on the incident optical wavelength corresponding to the metasurface unit. In an aspect, an orientation of the phase change material layer 13 may be optimized through the design of the cuboid nano-antenna, and in another aspect, association between the resonance frequency of the metasurface unit and the preset incident optical wavelength of the metasurface unit can be effectively ensured, and balanced phase modulation performance of the metasurface units can be ensured.

Figure 4:
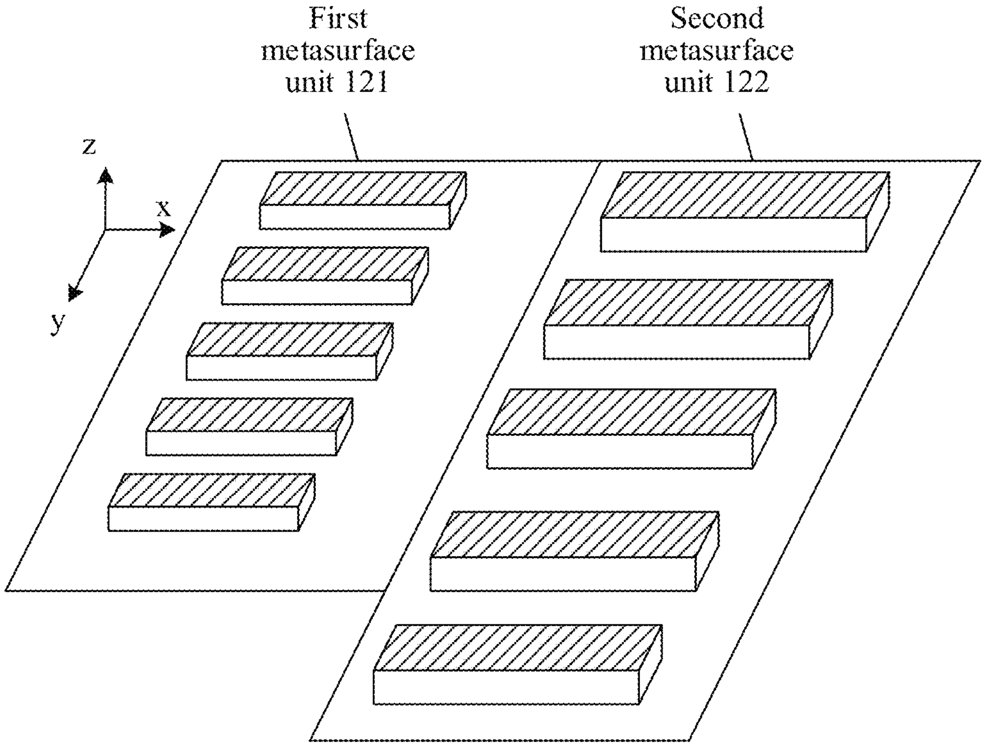
FIG. 4 is another schematic diagram of a structure of a metasurface unit according to an embodiment of this application.

Preferably, when the nano-antennas in the metasurface units in the first metasurface layer 12 are in the cuboid shape, the plurality of nano-antennas included in each metasurface unit may be sequentially arranged in the first direction y, and a long side of each nano-antenna is parallel to the arrangement direction (that is, the second direction x described above) of the at least two metasurface units. In other words, the cuboid nano-antennas included in the foregoing metasurface units are arranged in a structure similar to a reflection grating in the first direction y. For example, FIG. 4 is another schematic diagram of a structure of a metasurface unit according to an embodiment of this application. The first metasurface unit 121 and the second metasurface unit 122 are used as an example. As shown in FIG. 4, the first metasurface unit 121 includes a plurality of cuboid nano-antennas, and these nano-antennas are sequentially arranged in the first direction into a structure similar to a reflection grating, and a long side of each nano-antenna is parallel to the second direction x. Similarly, the second metasurface unit 122 also includes a plurality of cuboid nano-antennas, and these nano-antennas are sequentially arranged into a structure similar to a reflection grating in the first direction, and an axial direction of each nano-antenna is parallel to the second direction x.

In an embodiment, when the nano-antenna is in the cuboid shape, the plurality of nano-antennas in each metasurface unit may be designed into a structure similar to the reflection grating. In this way, each metasurface unit can still maintain good phase modulation performance when incident light is very narrow, and balanced modulation performance of the spatial light modulator 100 for incident light of different wavelengths can be ensured.

Figure 5:
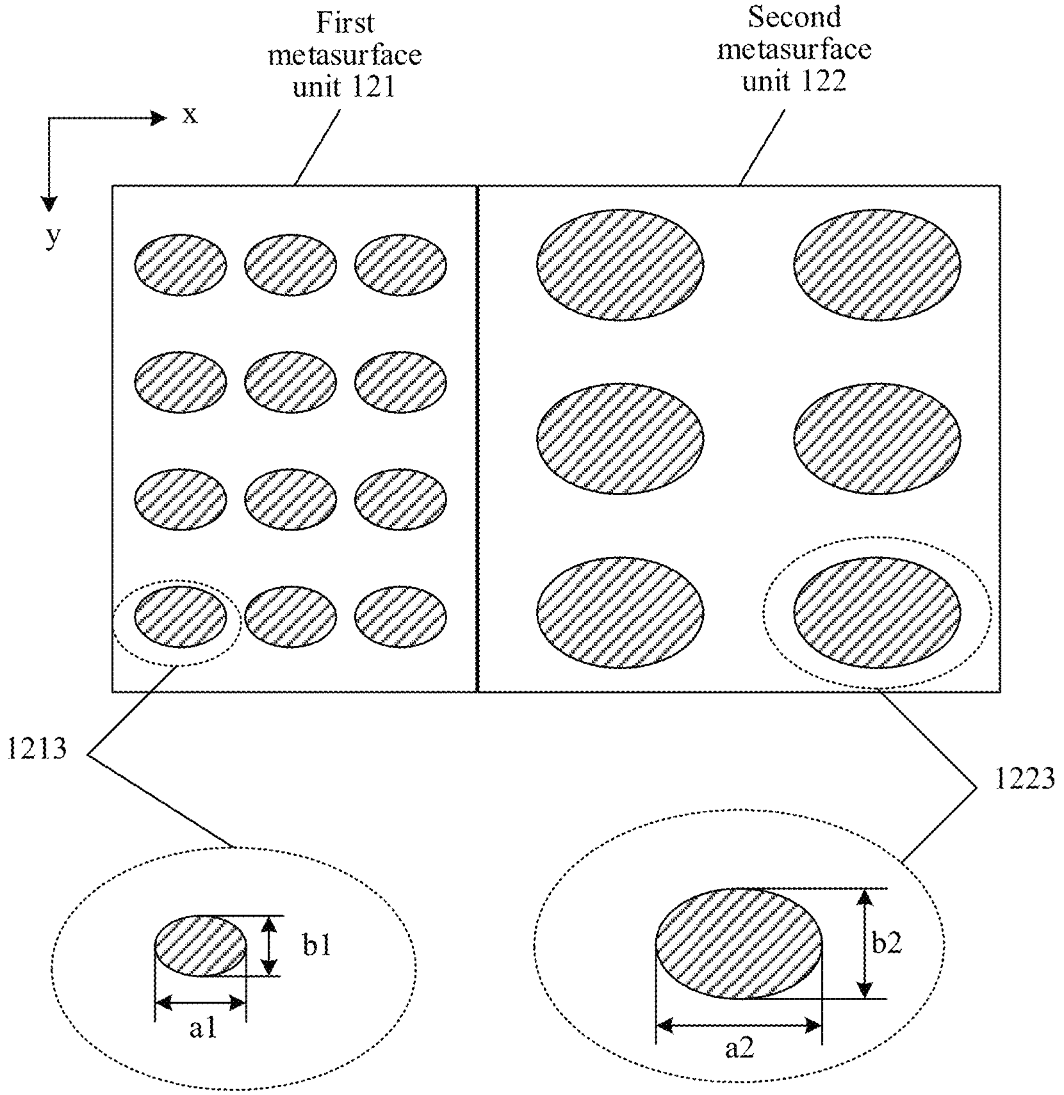
FIG. 5 is another schematic diagram of a structure of a metasurface unit according to an embodiment of this application.

In an embodiment, FIG. 5 is another schematic diagram of a structure of a metasurface unit according to an embodiment of this application. Herein, FIG. 5 is a partial top view of the first metasurface layer 12 in the third direction z. As shown in FIG. 5, the first metasurface unit 121 in the first metasurface layer 12 may be formed by uniformly arranging a plurality of elliptical cylindrical nano-antennas of a same size. It may be understood that when each nano-antenna is in the elliptical cylindrical shape, a projection of each nano-antenna on a plane on which the first direction y and the second direction x are located is in an elliptical shape. When the nano-antenna is the dielectric antenna, a length of a major axis and a length of a minor axis that correspond to a target cross section of each nano-antenna in the first metasurface unit 121 may be greater than or equal to a quarter of the first wavelength λ1, and less than or equal to twice the first wavelength λ1. When the nano-antenna is the metal antenna, the length of the major axis and the length of the minor axis that correspond to the target cross section of each nano-antenna may be greater than or equal to one tenth of the first wavelength λ1, and less than or equal to the first wavelength λ1. It should be noted herein that two bottom faces of each elliptical cylindrical nano-antenna are parallel to the first flat layer 15, and the target cross section of each elliptical cylindrical nano-antenna is a maximum cross section of each elliptical cylindrical nano-antenna in the second direction x (or may be understood as a maximum cross section that is of each elliptical cylindrical nano-antenna and that is perpendicular to the third direction z). For example, a nano-antenna 1213 in the first metasurface unit 121 is used as an example. It is assumed that a length of a major axis of a target cross section of the nano-antenna 1213 is a1, and a length of a minor axis of the target cross section is b1. When the nano-antenna is the dielectric antenna, value ranges of the length a1 and the length b1 are both [λ1/4, 2*λ1], that is, λ1/4≤a1≤2*λ1, and λ1/4≤b1≤2*λ1. When the nano-antenna is the metal antenna, the value ranges of the length a1 and the length b1 are both [λ1/10, λ1], that is, λ1/10≤a1≤λ1, and λ1/10≤b1≤λ1.

Similarly, the second metasurface unit 122 in the first metasurface layer 12 may also be formed by uniformly arranging a plurality of elliptical cylindrical nano-antennas of a same size. In addition, when the nano-antenna is the dielectric antenna, both a length of a major axis and a length of a minor axis of a target cross section of each nano-antenna in the second metasurface unit 122 are greater than or equal to a quarter of the second wavelength λ2, and are less than or equal to twice the second wavelength λ2. When the nano-antenna is the metal antenna, both the length of the major axis and the length of the minor axis of the target cross section of each nano-antenna may be greater than or equal to one tenth of the second wavelength λ2 and less than or equal to the second wavelength λ2. Herein, a nano-antenna 1223 in the second metasurface unit 122 is used as an example. It is assumed that a length of a major axis of a target cross section of the nano-antenna 1223 is a2, and a length of a minor axis of the target cross section of the nano-antenna 1223 is b2.

When each nano-antenna is the dielectric antenna, value ranges of the length a2 and the length b2 are both [λ2/4, 2*λ2], that is, λ2/4≤a2≤2*λ2, and λ2/4≤b2≤2*λ2. When each nano-antenna is the metal antenna, the value ranges of the length a2 and the length b2 are both [λ2/10, λ2], that is, λ2/10≤a2≤λ2, and λ2/10≤b2≤λ2.

It should be noted that, in actual implementation, a plurality of metasurface units other than the first metasurface unit 121 and the second metasurface unit 122 in the first metasurface layer 12 may use structures similar to structures of the first metasurface unit 121 and the second metasurface unit 122, or may use structures different from the structures of the first metasurface unit 121 and the second metasurface unit 122, provided that a resonance frequency of each of the plurality of metasurface units corresponds to a preset incident optical wavelength of each of the plurality of metasurface units. This is not limited in this application. Each metasurface unit in the first metasurface layer 12 preferably uses a similar structure.

It should be further noted herein that the foregoing describes the structure of each metasurface unit (for example, the first metasurface unit 121 and the second metasurface unit 122) by using an example in which the nano-antennas included in the metasurface unit are in a same shape. In actual implementation, a plurality of nano-antennas in a same metasurface unit may alternatively be in different shapes. For example, a part of the nano-antennas included in the first metasurface unit 121 may be in the cuboid shape, and another part of the nano-antennas included in the first metasurface unit 121 may be in the cylindrical shape. For another example, a part of the nano-antennas included in the second metasurface unit 122 may be in the cylindrical shape, and another part of nano-antennas included in the second metasurface unit 122 may be in the elliptical cylindrical shape. In other words, the shapes of the plurality of nano-antennas included in the metasurface unit in an embodiment may be the same, or may be different. This is not limited herein.

Further, in actual implementation, if the nano-antennas in the metasurface unit are uniformly arranged, the metasurface unit has a corresponding nano-antenna period on a plane on which the metasurface unit is located. Herein, the nano-antenna period is a distance between two points at same positions of two adjacent nano-antennas. Still refer to FIG. 2. The first metasurface unit 121 is used as an example. The first metasurface unit 121 has two nano-antenna periods on the plane on which the first direction y and the second direction x are located. One is a nano-antenna period L1 in the first direction y, and the other is a nano-antenna period L2 in the second direction x. The nano-antenna period L1 is a distance between two points at same positions of two adjacent cylindrical nano-antennas in the first direction y (herein, circle centers of end faces of the two adjacent cylindrical nano-antennas are used as an example). The nano-antenna period L2 is a distance between two points at same positions of two adjacent cylindrical nano-antennas in the second direction x (herein, circle centers of end faces of the two adjacent cylindrical nano-antennas are used as an example). It should be further noted that the nano-antenna period L1 and the nano-antenna period L2 may alternatively be equal. In this case, it may be understood that the metasurface unit has only one nano-antenna period.

With reference to the foregoing descriptions of the nano-antenna period, in a scenario in which the nano-antennas in the metasurface unit are uniformly arranged, regardless of whether the nano-antennas are in the cylindrical shape, the cuboid shape, the elliptical cylindrical shape, or another shape described above, the nano-antenna period corresponding to each metasurface unit should be less than or equal to twice the preset incident optical wavelength of each metasurface unit. The following uses an implementation of the cylindrical nano-antenna as an example. As shown in FIG. 2, assuming that nano-antenna periods corresponding to the first metasurface unit 121 are L1 and L2, L1 should be less than or equal to twice the first wavelength λ1 (that is, L1≤2*λ1), and L2 should also be less than or equal to twice the first wavelength λ1 (that is, L2≤2*λ1). Similarly, assuming that a nano-antenna period of the second metasurface unit 122 in the first direction y is L3, and a nano-antenna period of the second metasurface unit 122 in the second direction x is L4, L3 should be less than or equal to twice the second wavelength λ2 (that is, L3≤2*λ2), and L4 should be less than or equal to twice the second wavelength λ2 (that is, L4≤2*λ2).

It should be additionally noted that, in the foregoing several optional implementations, the plurality of nano-antennas included in each metasurface unit are uniformly arranged. In actual implementation, the plurality of nano-antennas included in each metasurface unit may alternatively be in a non-uniform arrangement manner, provided that it is ensured that a resonance frequency corresponding to each metasurface unit is associated with the preset incident optical wavelength of each metasurface unit. In other words, the foregoing merely lists several optional implementations of structures of the metasurface unit. In an embodiment, the metasurface unit is alternatively implemented in an embodiment other than the foregoing several optional implementations, provided that the resonance frequency corresponding to the metasurface unit can be associated with the preset incident optical wavelength of the metasurface unit. An actual structure of the metasurface unit is not limited in this application.

In an embodiment, a width of each metasurface unit in the first metasurface layer 12 in the second direction x may adapt to a width of incident light of each metasurface unit in the second direction x, and widths of the metasurface units in the second direction x may be the same or may be different. It should be noted herein that, when the plurality of nano-antennas in the metasurface unit are uniformly arranged, the width of the metasurface unit in the second direction x may be a product of the nano-antenna period of the metasurface unit in the second direction x and a quantity of nano-antennas corresponding to each row of nano-antennas in the second direction x. For example, as shown in FIG. 2, if the nano-antenna period of the first metasurface unit 121 in the second direction x is L2, and a quantity of nano-antennas corresponding to each row of nano-antennas of the first metasurface unit 121 in the second direction x is 3, a width of the first metasurface unit 121 in the second direction x is 3*L2. Similarly, if the nano-antenna period of the second metasurface unit 122 in the second direction x is L4, and a quantity of nano-antennas corresponding to each row of nano-antennas of the second metasurface unit 122 in the second direction x is 4, a width of the first metasurface unit 122 in the second direction x is 2*L4. Values of 3*L2 and 2*L4 may be equal or may not be equal.

Further, during implementation, the preset incident optical wavelength of each metasurface unit may be changed regularly in the second direction x (for example, in descending order in the second direction x, or in ascending order in the second direction x), or may be changed irregularly. This is not limited in this application. In addition, a size of the nano-antenna and the nano-antenna period included in each metasurface unit may be changed regularly in the second direction x, or may be changed irregularly. This is not limited in this application.

In an embodiment, the preset incident optical wavelength of each metasurface unit included in the first metasurface layer 12 and the width of each metasurface unit may be designed to change regularly in the second direction x, or may be designed to change irregularly. In this way, the spatial light modulator 100 can be applied to an optical system in which incident light is in regular or irregular communication arrangement, and applicability and practicability of the spatial light modulator 100 can be ensured.

The foregoing describes a plurality of possible implementations of the first metasurface layer 12. The following further describes another structure of the spatial light modulator 100 with reference to the foregoing descriptions of the first metasurface layer 12.

In an embodiment, the first metasurface layer 12 may be included on a side that is of the phase change material layer 13 and that faces the first electrode layer 11, and the first metasurface layer 12 is in contact with the first electrode layer 11. It should be understood that, because the phase change material layer 13 is a fluid, the first metasurface layer 12 is formed by arranging a plurality of nano-antennas, and a gap exists between the nano-antennas, the first metasurface layer 12 and the phase change material layer 13 may be disposed in an embedding manner, but the first metasurface layer 12 is not completely included in the phase change material layer 13. A surface of a side that is of each nano-antenna included in the first metasurface layer 12 and that faces the first electrode layer 11 is in direct contact with the first electrode layer 11 through the phase change material layer. For example, as shown in FIG. 1, the first metasurface layer 12 is embedded with the side that is of the phase change material layer 13 and that faces the first electrode layer 11, and is in contact with the first electrode layer 11 through the phase change material layer 13.

Figure 6:
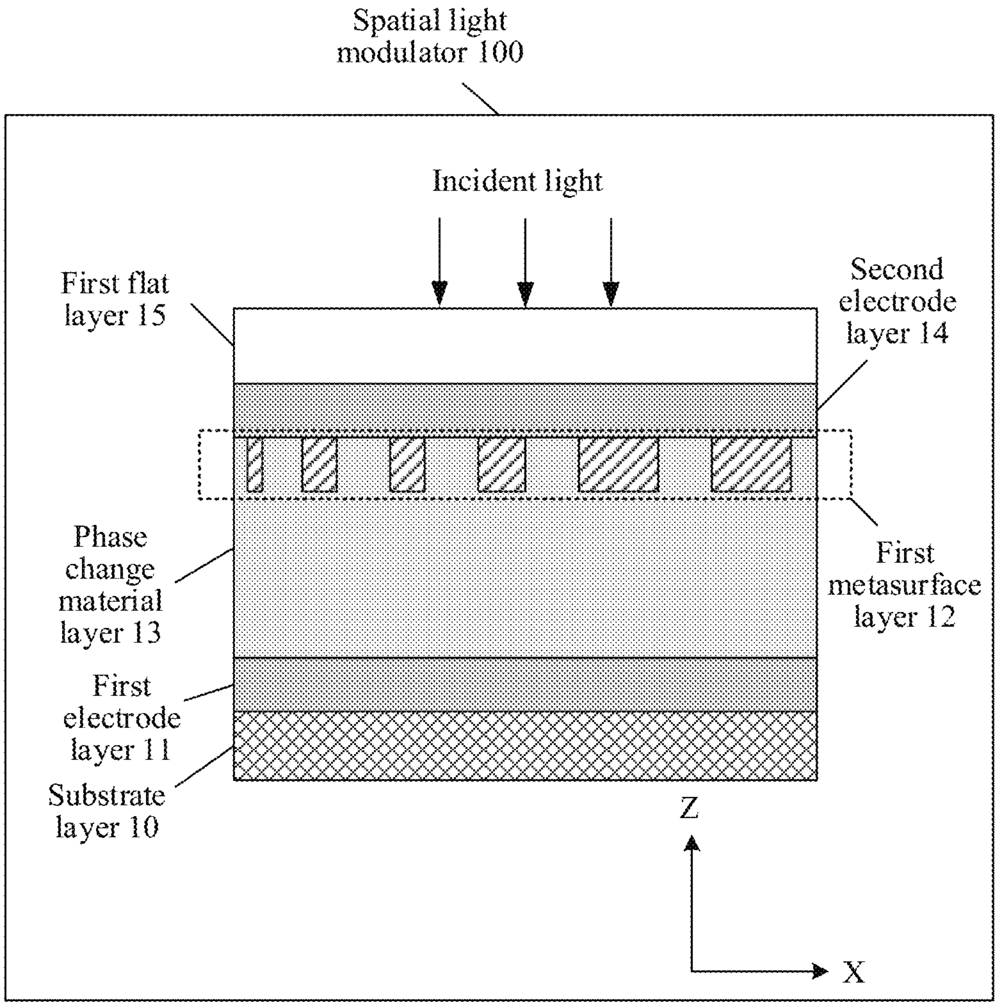
FIG. 6 is another schematic diagram of a structure of a spatial light modulator according to an embodiment of this application.

Alternatively, FIG. 6 is another schematic diagram of a structure of a spatial light modulator according to an embodiment of this application. As shown in FIG. 6, the first metasurface layer 12 may alternatively be included on a side that is of the phase change material layer 13 and that faces the second electrode layer 14, and is in contact with the second electrode layer 14. Similar to the foregoing descriptions, the inclusion means that the first metasurface layer 12 is embedded with the side that is of the phase change material layer 13 and that faces the second electrode layer 14, and is not completely included in the phase change material layer 13.

Figure 7:
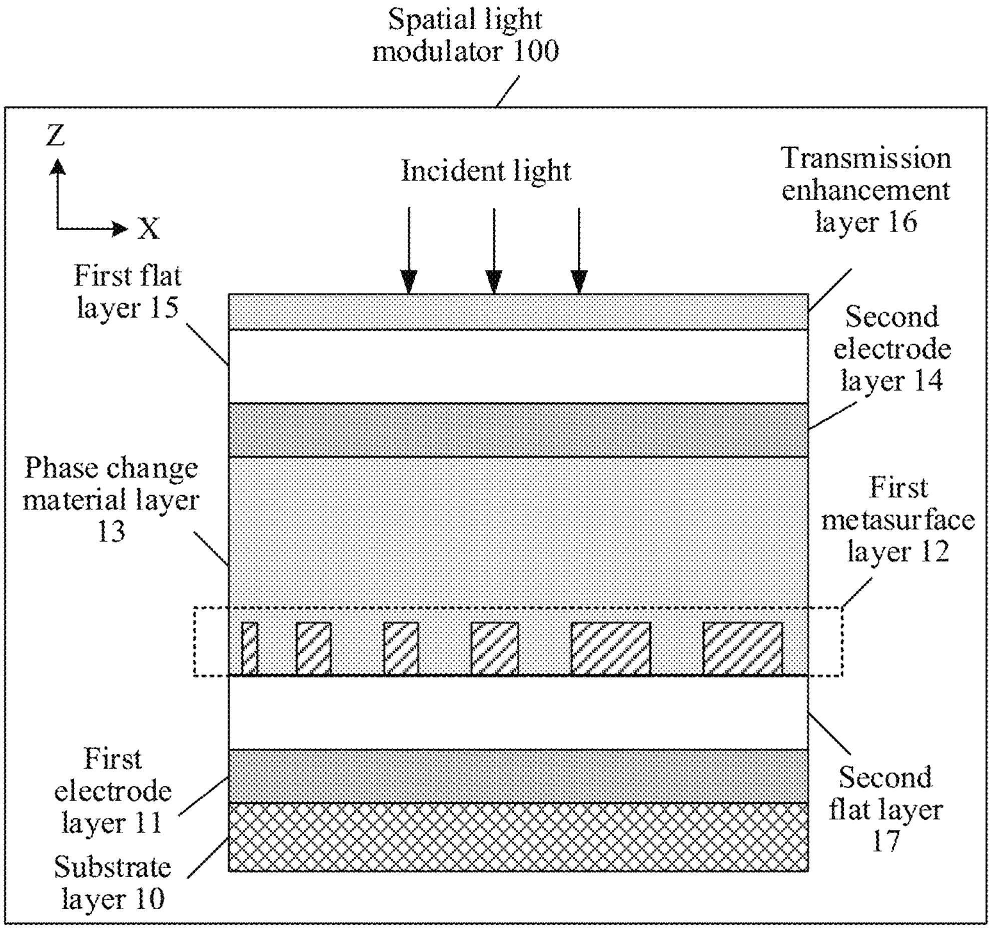
FIG. 7 is another schematic diagram of a structure of a spatial light modulator according to an embodiment of this application.

In an embodiment, FIG. 7 is another schematic diagram of a structure of a spatial light modulator according to an embodiment of this application. As shown in FIG. 7, the spatial light modulator 100 may further include a transmission enhancement layer 16 and a second flat layer 17. The transmission enhancement layer 16 may be disposed on a side that is of the first flat layer 15 and that is away from the second electrode layer 14. In other words, the transmission enhancement layer 16 may be disposed on a face that is of the first flat layer 15 and that faces away from the second electrode layer 14, and is in contact with the face. The second flat layer 17 may be disposed between the phase change material layer 13 and the first electrode layer 11. In addition, one face of the second flat layer 17 is in contact with the first electrode layer 11, and the other face of the second flat layer 17 is in contact with the phase change material layer 13 (when the first metasurface layer 12 is included in the phase change material layer 13 and faces the second electrode layer 14), or the other face of the second flat layer 17 is in contact with both the phase change material layer 13 and the first metasurface layer 12 (when the first metasurface layer 12 is included in the phase change material layer and faces the first electrode layer 11).

During actual operating, the transmission enhancement layer 16 may be configured to increase an amount of incident light admitted by the spatial light modulator 100, and reduce an energy loss of the incident light. The second flat layer 17 is mainly configured to fasten, in combination with the first flat layer 15, a phase change material of the fluid included in the phase change material layer 13.

When the spatial light modulator 100 includes the second flat layer 17, in an embodiment, a position of the first metasurface layer 12 may be shown in FIG. 7, in other words, the first metasurface layer 12 may be included on the side that is of the phase change material layer 13 and that faces the first electrode layer 11, and is in direct contact with the second flat layer 17. Herein, similar to the foregoing descriptions, the first metasurface layer 12 is not completely included in the phase change material layer 13, but a partial surface of the first metasurface layer 12 is in contact with the second flat layer 17 through the phase change material layer 13. In an embodiment, as described above, the first metasurface layer 12 may alternatively be included on the side that is of the phase change material layer 13 and that faces the second electrode layer 14, and is simultaneously in contact with the second electrode layer 14.

Figure 8:
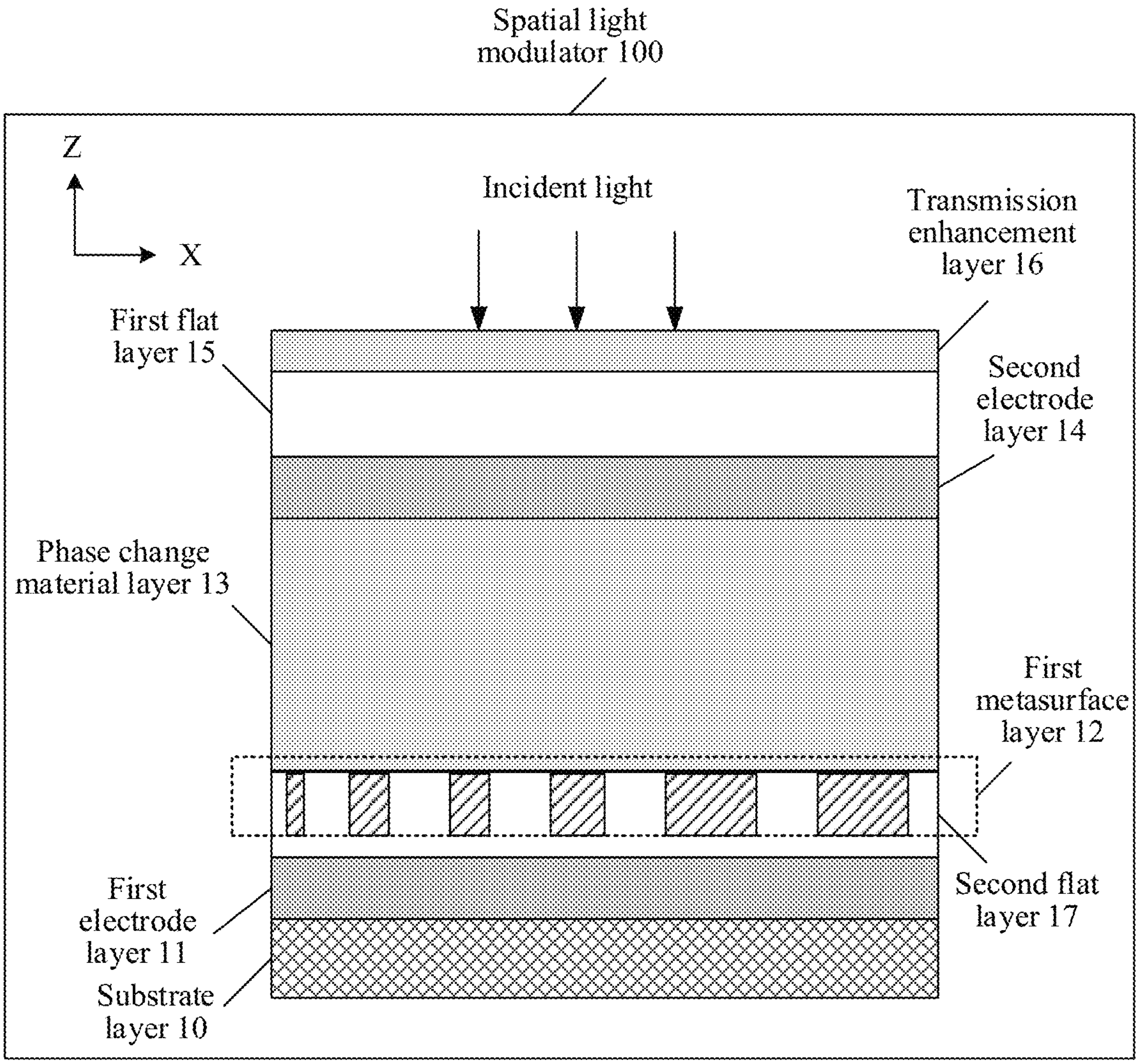
FIG. 8 is another schematic diagram of a structure of a spatial light modulator according to an embodiment of this application.

In still an embodiment, FIG. 8 is another schematic diagram of a structure of a spatial light modulator according to an embodiment of this application. As shown in FIG. 8, the first metasurface layer 12 is included on a side that is of the second flat layer 17 and that faces the phase change material layer 13, and is in contact with the phase change material layer 13. It should also be understood herein that the inclusion means that the first metasurface layer 12 is embedded with the side that is of the second flat layer 17 and that faces the phase change material layer 13, and is not completely included in the second flat layer 17. In an embodiment, the first metasurface layer 12 is disposed in the second flat layer 17. In this way, impact of the first metasurface layer 12 on a molecular orientation of a material of the phase change material layer 13 can be reduced, and phase change performance of the phase change material layer 13 can be improved.

Figure 9:
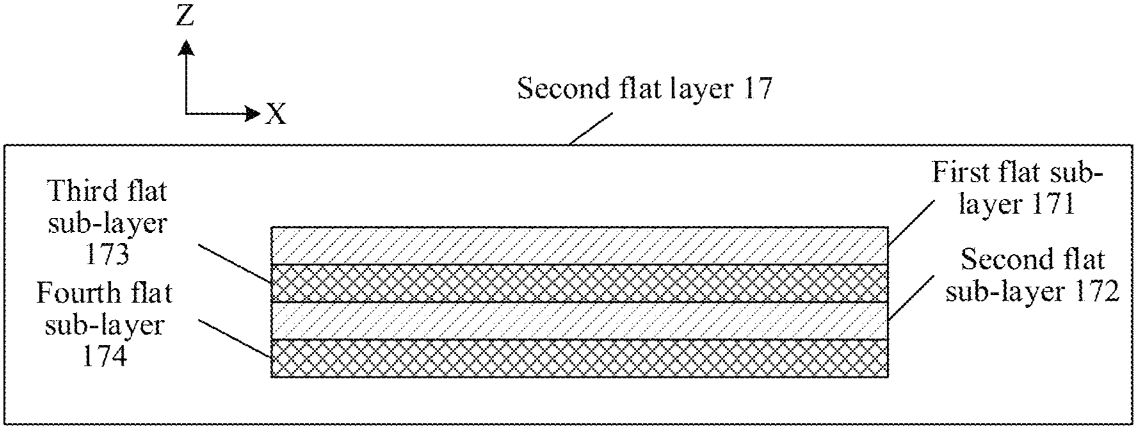
FIG. 9 is a schematic diagram of a structure of a second flat layer according to an embodiment of this application.

Further, the second flat layer 17 may include at least two stacked flat sub-layers, and any two adjacent flat sub-layers in the at least two stacked flat sub-layers have different refractive indexes. It should be understood herein that, for any two non-adjacent flat sub-layers included in the second flat layer 17, refractive indexes of the two flat sub-layers may be the same or may be different. This is not limited in this application. For example, FIG. 9 is a schematic diagram of a structure of a second flat layer according to an embodiment of this application. As shown in FIG. 9, it is assumed that the second flat layer 17 is formed by stacking four flat sub-layers, and the four flat sub-layers include a first flat sub-layer 171, a second flat sub-layer 172, a third flat sub-layer 173, and a fourth flat sub-layer 174. A refractive index of the third flat sub-layer 173 is different from refractive indexes of the first flat sub-layer 171 and the second flat sub-layer 172, and the refractive index of the second flat sub-layer 172 is different from a refractive index of the fourth flat sub-layer 174. The refractive indexes of the first flat sub-layer 171 and the second flat sub-layer 172 may be the same, or may be different. The refractive indexes of the third flat sub-layer 173 and the fourth flat sub-layer 174 may be the same or may be different.

In an embodiment, assuming that a center wavelength of an operating wave range of the spatial light modulator 100 is a third wavelength λ3, a thickness (which is assumed to be H0 herein) of each flat sub-layer included in the second flat layer 17 in the third direction z should be greater than or equal to one fiftieth of the third wavelength λ3 and less than or equal to the third wavelength λ3, that is, $\lambda 3/50 \le H0 \le \lambda 3$.

Figure 10:
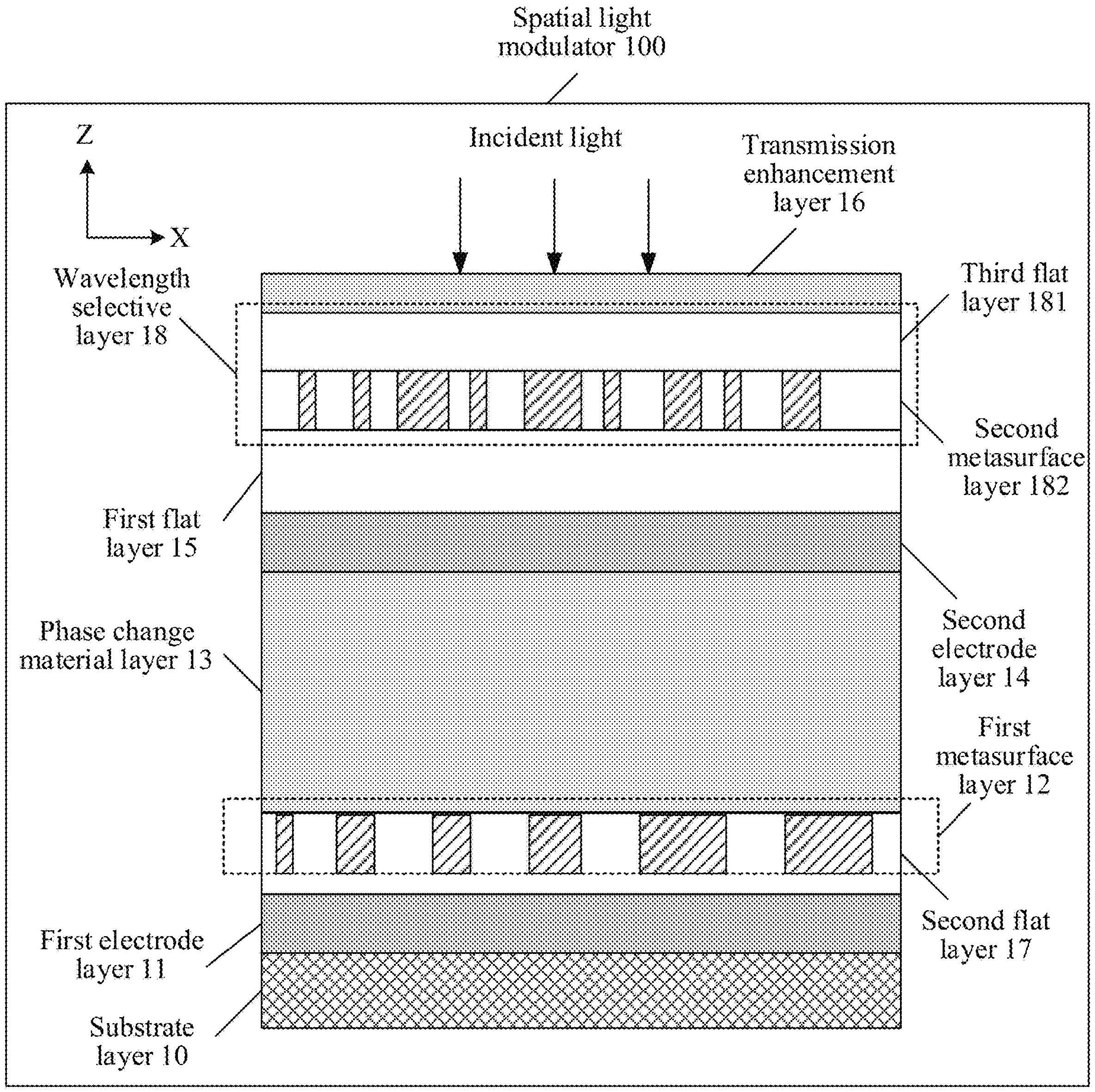
FIG. 10 is another schematic diagram of a structure of a spatial light modulator according to an embodiment of this application.

In an embodiment, FIG. 10 is another schematic diagram of a structure of a spatial light modulator according to an embodiment of this application. As shown in FIG. 10, the spatial light modulator 100 may further include a wavelength selective layer 18, and the wavelength selective layer 18 may be disposed on a side that is of the phase change material layer 13 and that faces away from the substrate layer 10. In other words, the wavelength selective layer 18 may be disposed at any position on the side that is of the phase change material layer 13 and that faces away from the substrate layer 10, provided that it is ensured that the incident light of the spatial light modulator 100 arrives at the phase change material layer 13 through the wavelength selective layer 18. For example, as shown in FIG. 10, when the spatial light modulator 100 includes the transmission enhancement layer 16, the wavelength selective layer 18 may be disposed between the transmission enhancement layer 16 and the first flat layer 15.

During actual operating, the wavelength selective layer 18 is mainly configured to perform wavelength selection on the incident light of the spatial light modulator 100, and emit incident light of a wavelength to a position that is on the phase change material layer 13 and that corresponds to the wavelength. Herein, a preset incident wavelength of the metasurface unit corresponding to the position is the wavelength. For example, the wavelength selective layer 18 may be configured to select incident light of the first wavelength λ1 from the incident light of the spatial light modulator 100, and send the incident light of the first wavelength λ1 to a position that is on the phase change material layer 13 and that is corresponding to the first metasurface unit 121 (for ease of differentiation, the following uses a first position as a substitute for description). It should be understood herein that a partial phase change material layer at the first position corresponding to the first metasurface unit 121 is mainly configured to perform first phase modulation on the incident light of the first wavelength λ1 to obtain a corresponding first optical wave. For another example, the wavelength selective layer 18 may be further configured to select incident light of the second wavelength λ2 from the incident light of the spatial light modulator 100, and send the incident light of the second wavelength λ2 to a position that is on the phase change material layer 13 and that corresponds to the second metasurface unit 122 (for ease of differentiation, the following uses a second position as a substitute for description). It should be understood herein that a partial phase change material layer at the second position corresponding to the second metasurface unit 122 is mainly configured to perform first phase modulation on the incident light of the second wavelength λ2 to obtain a corresponding sixth optical wave, and send the sixth optical wave to the second metasurface unit 122.

In an embodiment, the wavelength selective layer 18 is disposed on the side that is of the phase change material layer 13 and that faces away from the substrate layer 10. In this way, incident light of a wavelength can be sent to a position of the wavelength on the phase change material layer 13 in a centralized manner, to arrive at a metasurface unit corresponding to the wavelength as much as possible. In this way, efficiency of using energy of the incident light by the spatial light modulator 100 can be effectively improved, and power consumption of the spatial light modulator 100 is reduced. In addition, in this way, phase modulation pressure of the metasurface unit may also be reduced, and crosstalk is further reduced.

Further, as shown in FIG. 10, the wavelength selective layer 18 may include a third flat layer 181 and a second metasurface layer 182. Both the third flat layer 181 and the second metasurface layer 182 are parallel to the first flat layer 15.

Preferably, as shown in FIG. 10, the second metasurface layer 182 may be formed by arranging a plurality of cuboid nano-antennas. Sizes and nano-antenna periods of the plurality of cuboid nano-antennas are not limited in this application.

It should be further noted herein that the plurality of nano-antennas included in the second metasurface layer 182 may alternatively be in a cylindrical shape, an elliptical cylindrical shape, or another shape. This is not limited in this application. Similarly, the shapes of the plurality of nano-antennas included in the second metasurface layer 182 may be the same, or may be different. This is not limited in this application either.

Figure 11:
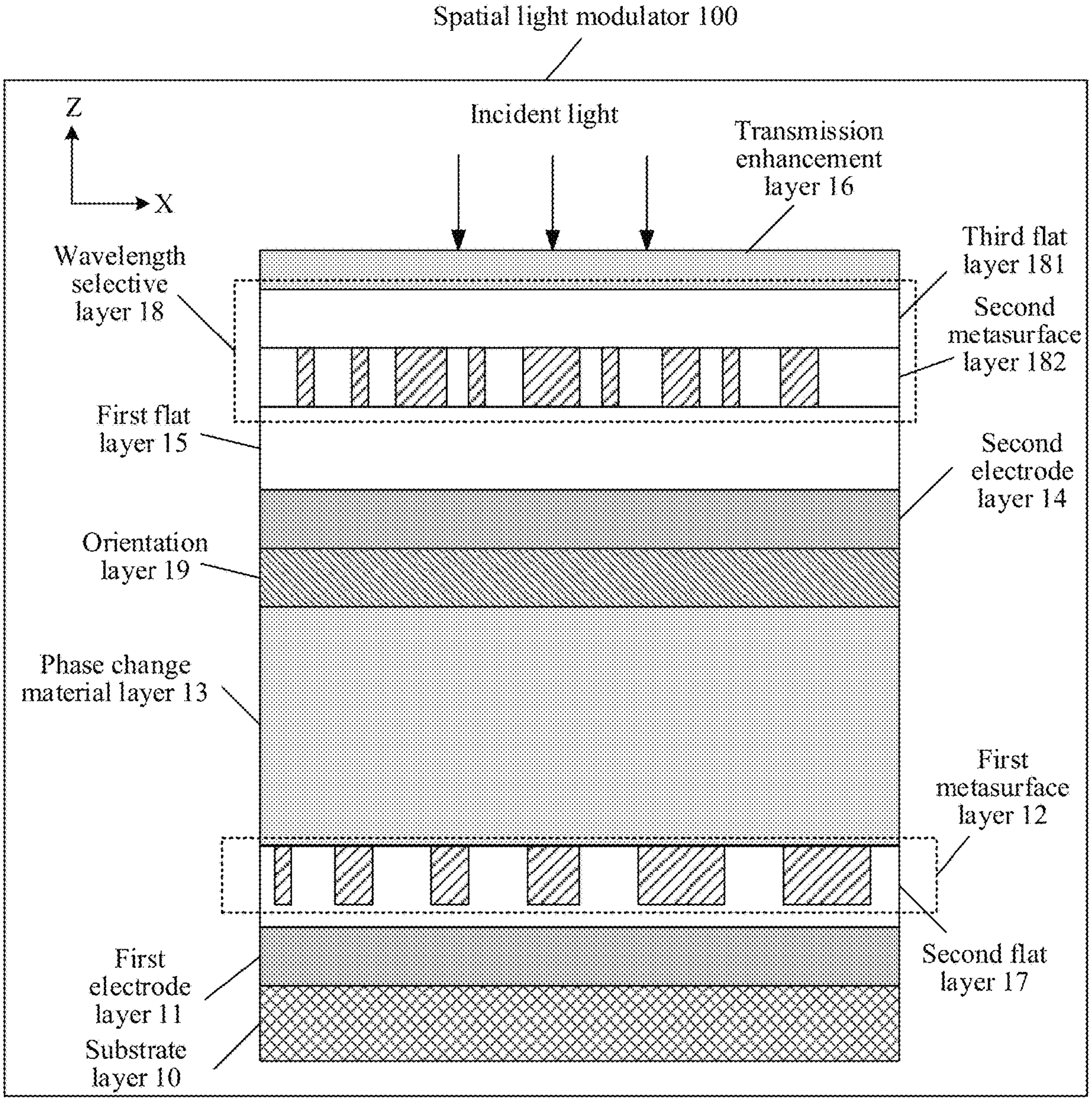
FIG. 11 is another schematic diagram of a structure of a spatial light modulator according to an embodiment of this application.

In an embodiment, FIG. 11 is another schematic diagram of a structure of a spatial light modulator according to an embodiment of this application. As shown in FIG. 11, the spatial light modulator 100 may further include an orientation layer 19. The orientation layer 19 is disposed on a side that is of the foregoing phase change material layer 13 and that faces away from the foregoing first metasurface layer 12. In other words, the orientation layer 19 is disposed on a surface that is of the phase change material layer 13 and that is away from the first metasurface layer 12. As shown in FIG. 11, the side that is of the phase change material layer 13 and that faces away from the first metasurface layer 12 is a side that is of the phase change material layer 13 and that faces the second electrode layer 14. Therefore, the orientation layer 19 may be disposed between the second electrode layer 14 and the phase change material layer 13.

During actual operating, the orientation layer 19 is configured to control the molecular orientation of the material included in the phase change material layer 13, to ensure phase modulation performance of the phase change material layer 13.

In an embodiment, the foregoing first electrode layer 11 may include a plurality of first electrodes, and the foregoing second electrode layer 14 may also include a plurality of second electrodes. In addition, the plurality of first electrodes and the plurality of second electrodes form a plurality of electrode pairs, and at least one of the plurality of electrode pairs corresponds to one of the at least two metasurface units 120. It should be noted herein that a voltage connected to each of the plurality of electrode pairs may be the same or may be different. This is not limited in this application. There may be one or more electrode pairs corresponding to a metasurface unit. This is not limited in this application.

During actual operating, any one or more electrode pairs of the plurality of electrode pairs are configured to provide a corresponding voltage for a partial phase change material layer between the any one or more electrode pairs, so that the partial phase change material layer can perform first phase modulation on a received optical wave, and send the optical wave obtained through the first phase modulation to a metasurface unit corresponding to the any one or more electrode pairs.

Figure 12:
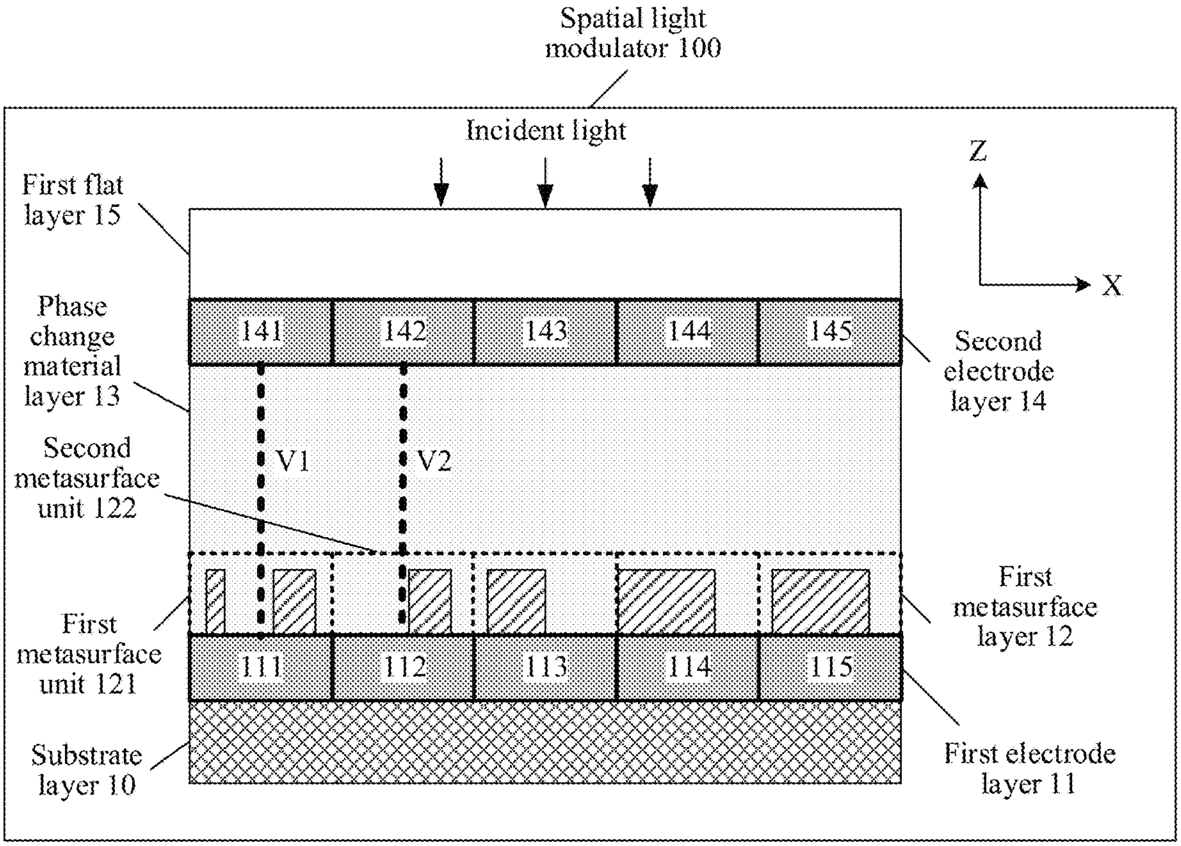
FIG. 12 is another schematic diagram of a structure of a spatial light modulator according to an embodiment of this application.

For example, FIG. 12 is another schematic diagram of a structure of a spatial light modulator according to an embodiment of this application. As shown in FIG. 12, it is assumed that the first electrode layer 11 includes five first electrodes, that is, a first electrode 111, a first electrode 112, a first electrode 113, a first electrode 114, and a first electrode 115. It is assumed that the second electrode layer 14 includes five second electrodes, that is, a second electrode 141, a second electrode 142, a second electrode 143, a second electrode 144, and a second electrode 145. The first electrode 111 and the second electrode 141 form an electrode pair corresponding to the first metasurface unit 121 (for ease of differentiation, the following uses a first electrode pair as a substitute for description), and the first electrode pair is connected to a voltage V1. The first electrode 112 and the second electrode 142 form an electrode pair corresponding to the second metasurface unit 122 (for ease of differentiation, the following uses a second electrode pair as a substitute for description), and the second electrode pair is connected to a voltage V2. During actual operating, under action of the voltage V1, a partial phase change material layer between the first electrode pair may perform first phase modulation on the incident light of the first wavelength 11 to obtain the first optical wave, and send the first optical wave to the first metasurface unit 121 to perform second phase modulation. Similarly, under action of the voltage V2, a partial phase change material layer between the second electrode pair may perform first phase modulation on the incident light of the second wavelength λ2 to obtain the sixth optical wave, and send the sixth optical wave to the second metasurface unit 122 to perform second phase modulation. It may be understood that, in FIG. 12, a scenario in which one electrode pair corresponds to one metasurface unit is used as an example for illustration. In an embodiment, alternatively, a plurality of electrode pairs may correspond to one metasurface unit. For example, alternatively, both the first electrode pair formed by the first electrode 111 and the second electrode 141 and the second electrode pair formed by the first electrode 112 and the second electrode 142 may correspond to the first metasurface unit 121, and a third electrode pair formed by the first electrode 113 and the second electrode 143 and a fourth electrode pair formed by the first electrode 114 and the second electrode 145 may correspond to the second metasurface unit 122.

It should be further noted herein that in some application scenarios (for example, a projection scenario), the first electrode and the second electrode may alternatively be referred to as pixel electrodes, and the electrode pair formed by the first electrode and the second electrode may alternatively be referred to as a pixel electrode pair.

In an embodiment, a plurality of independent electrodes form an electrode layer. In this way, independent power supply can be implemented for different areas of the phase change material layer 13 through the electrode layer, so that a phase modulation depth of the phase change material layer 13 can be deepened, and phase modulation performance of the phase change material layer 13 is improved.

It should be additionally noted that a material of the substrate layer 10 described above may be silicon, silicon nitride, or the like. The second electrode layer 14 described above is usually made of a transparent material, for example, nitrogen dioxide. When the spatial light modulator 100 is of a transmissive type, a material of the first electrode layer 11 described above may be the same as a material of the second electrode layer 14. When the spatial light modulator 100 is of a reflective type, a material of the spatial light modulator 100 may be metal (such as gold, copper, or aluminum), or may be a reflective structure like a Bragg reflection grating formed by another material. The flat layer (for example, the first flat layer 15, the second flat layer 17, and the third flat layer 181) described above may be made of silicon dioxide or the like. A material of the phase change material layer 13 described above may be a phase change material like a liquid crystal. A material (which may also be understood as a material of each nano-antenna) of the metasurface layers (for example, the first metasurface layer 12 and the second metasurface layer 182) described above may be determined by an optical wave range applied to the spatial light modulator 100. For example, assuming that the optical wave range applied to the spatial light modulator 100 is 620 nm to 670 nm, the material of the metasurface layer may be titanium dioxide. When the optical wave range applied to the spatial light modulator 100 is 1530 nm to 1565 nm, the material of the metasurface layer may be silicon. Certainly, the material of the metasurface layer may alternatively be metal, such as gold, copper, or aluminum.

It should be further noted herein that, in the foregoing embodiment, descriptions of a technical feature in an implementation may also be applied to explain a corresponding technical feature mentioned in an embodiment. For example, the foregoing describes a plurality of optional structures of the first metasurface layer 12 based on FIG. 2 to FIG. 5. All the plurality of optional structures may be descriptions of the metasurface layer included in the spatial light modulator 100 described in FIG. 6, FIG. 7, and the like. In other words, in the foregoing embodiment, different structures of components or modules in the spatial light modulator 100 may be combined with each other, and solutions obtained by combining the components or modules with each other should be considered to fall within the protection scope of this application.

In an embodiment, the phase change material layer 13 and the first metasurface layer 12 that is designed in a differentiated manner for the incident light of different wavelengths are disposed in the spatial light modulator 100. In an aspect, the first metasurface layer 12 is designed in the differentiated manner, so that the spatial light modulator 100 can perform balanced phase modulation on the incident light of different wavelengths through different metasurface units included in the first metasurface layer 12. This can effectively resolve a problem of large crosstalk caused by different reflection efficiency for the incident light of different wavelengths, and improve modulation performance of the spatial light modulator 100. In another aspect, joint phase modulation may alternatively be performed on the incident light of different wavelengths through the phase change material layer 13 and the first metasurface layer 12, so that a phase depth of the spatial light modulator 100 is further deepened, and a deflection angle range of the emitted light of the spatial light modulator 100 is larger.

Figure 13:
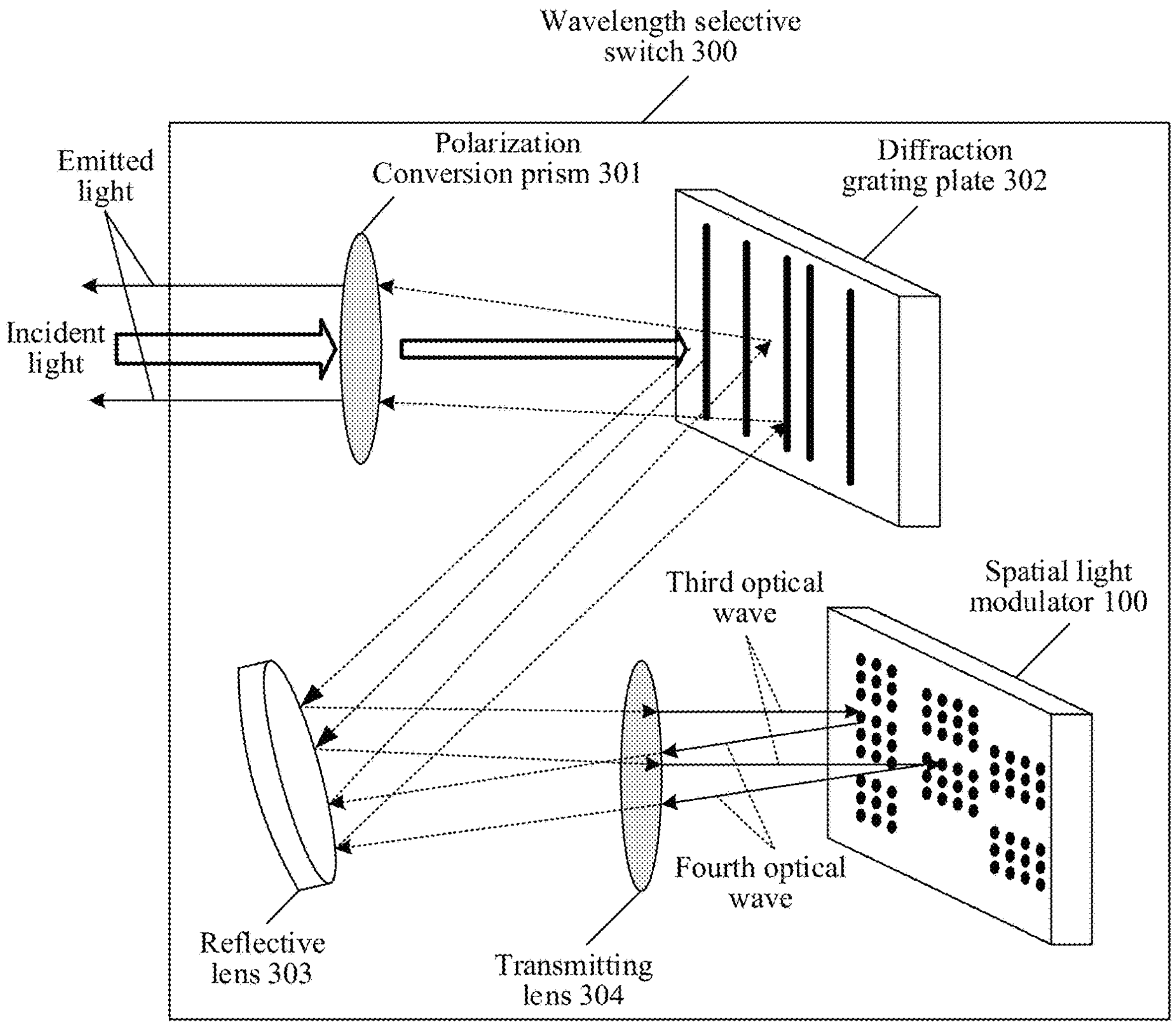
FIG. 13 is a schematic diagram of a structure of a wavelength selective switch according to an embodiment of this application.

FIG. 13 is a schematic diagram of a structure of a wavelength selective switch according to an embodiment of this application. As shown in FIG. 13, a wavelength selective switch 300 may include a polarization conversion prism 301, a diffraction grating plate 302, a reflective lens 303, a transmitting lens 304, and the spatial light modulator 100 described above.

During actual operating, the polarization conversion prism 301, the diffraction grating plate 302, the reflective lens 303, and the transmitting lens 304 are jointly configured to convert incident light of the wavelength selective switch 300 into a plurality of third optical waves of different wavelengths, and send the plurality of third optical waves to the spatial light modulator 100. The spatial light modulator 100 may be configured to perform phase modulation on each of the plurality of third optical waves to obtain a plurality of fourth optical waves of different phases, and output the plurality of fourth optical waves of different phases at different deflection angles. Further, the plurality of fourth optical waves pass through the transmitting lens 304, the reflective lens 303, the diffraction grating plate 302, and the polarization conversion prism 301 in sequence, and are propagated to an outside of the wavelength selective switch 300 as emitted light of the wavelength selective switch 300. Herein, the polarization conversion prism 301 is mainly configured to perform polarization state adjustment on incident light of the polarization conversion prism 301, and emit an optical wave after the polarization state adjustment. The diffraction grating plate 302 is mainly configured to diffract multiplexed incident light into optical waves of different wavelengths, and emit the optical waves of different wavelengths at different deflection angles. The reflective lens 303 is mainly configured to emit incident light of the reflective lens 303, and the transmitting lens 304 is mainly configured to perform focus adjustment on incident light of the transmitting lens 304.

In an embodiment, the spatial light modulator 100 is used to form the wavelength selective switch 300. Because crosstalk of the spatial light modulator 100 is small and phase modulation performance is stable, wavelength selection precision of the wavelength selective switch 300 can be effectively ensured.

In an embodiment, the incident light of the wavelength selective switch 300 may be input through an optical fiber (for ease of differentiation, the following uses a first optical fiber as a substitute for description) in an optical fiber array connected to the wavelength selective switch 300. Herein, the optical fiber array may be formed by a plurality of optical fibers. The plurality of fourth optical waves output by the spatial light modulator 100 at different deflection angles are converted into a plurality of beams of emitted light of the wavelength selective switch 300 through sequential action of the transmitting lens 304, the reflective lens 303, the diffraction grating plate 302, and the polarization conversion prism 301, and the plurality of beams of emitted light are respectively output through different optical fibers in the optical fiber array.

Embodiment 2

With continuous development of optical technologies, the use of spatial light modulators becomes more and more common, especially in common projection systems. However, in an existing projection system, because the spatial light modulator used by the projection system has poor light filtering performance, overall performance is poor.

Figure 14:
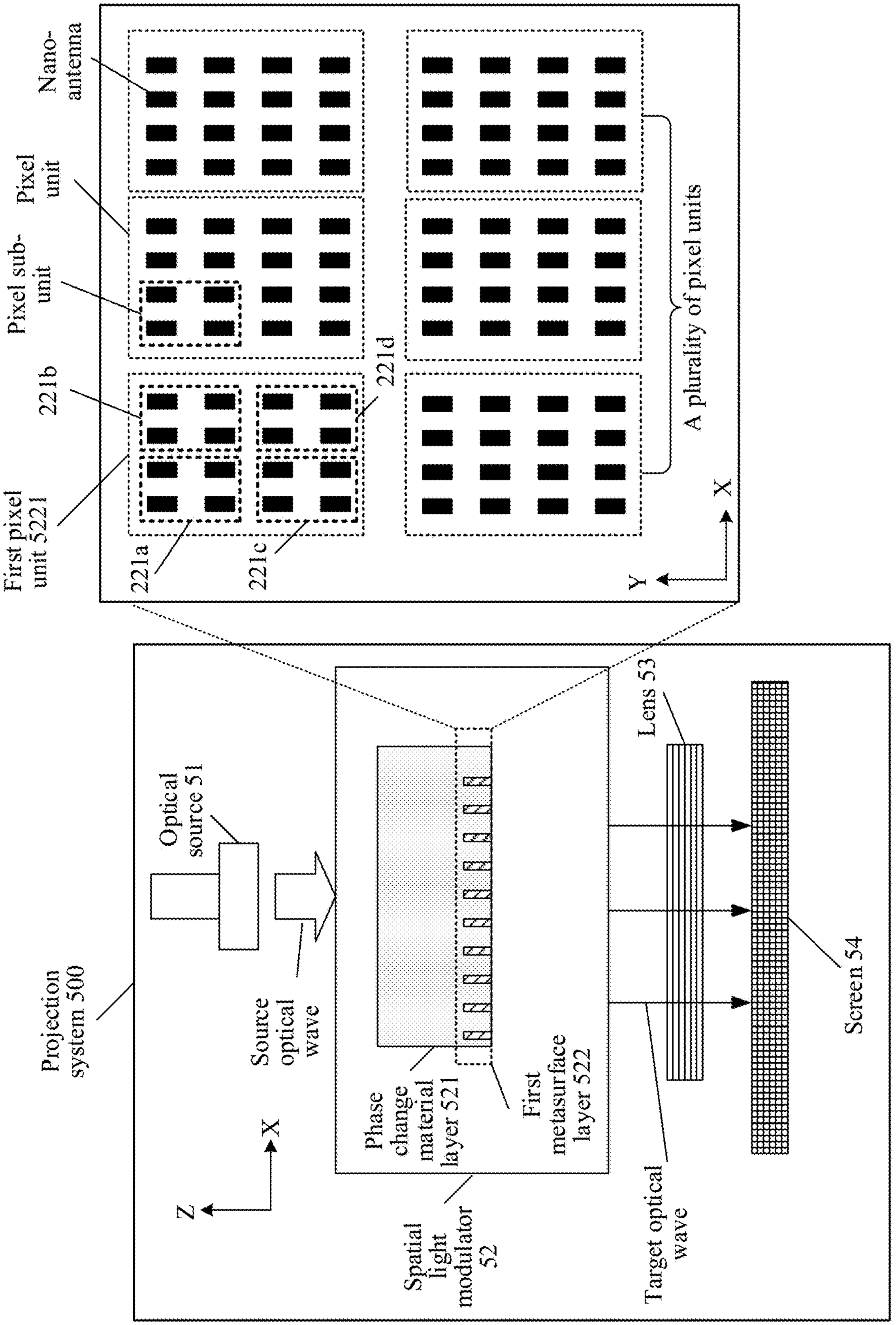
FIG. 14 is a schematic diagram of a structure of a projection system according to an embodiment of this application.

To resolve the problem, this application provides a new projection system. FIG. 14 is a schematic diagram of a structure of a projection system according to an embodiment of this application. As shown in FIG. 14, a projection system 500 may include an optical source 51, a spatial light modulator 52, a lens 53, and a screen 54. The spatial light modulator 52 may include a phase change material layer 521 and a first metasurface layer 522 that are stacked on each other. The first metasurface layer 522 may include a plurality of pixel units, each of the plurality of pixel units may further include a plurality of pixel sub-units, and each of the plurality of pixel sub-units further includes at least four nano-antennas. Herein, as shown in FIG. 14, to facilitate understanding of a spatial structure of the projection system 500, a three-dimensional spatial orientation coordinate system is further introduced. The spatial orientation coordinate system includes a first direction x, a second direction y, and a third direction z. The third direction z is perpendicular to both the phase change material layer 521 and the first metasurface layer 522, and is opposite to a direction of incident light of the spatial light modulator 52. The first direction x and the second direction y are respectively arrangement directions of the nano-antennas included in the first metasurface layer 522, and the first direction x and the second direction y are perpendicular to each other.

The plurality of pixel sub-units include at least two pixel sub-units of different resonance frequencies, and a resonance frequency corresponding to each pixel sub-unit determines a wavelength of an optical wave that can pass through each pixel sub-unit. A first pixel unit 5221 included in the plurality of pixel units is used as an example. Still refer to FIG. 14. Assuming that the first pixel unit 5221 includes four pixel sub-units that respectively are a pixel sub-unit 221*a*, a pixel sub-unit 221*b*, a pixel sub-unit 221*c*, and a pixel sub-unit 221*d*, at least two pixel sub-units of different resonance frequencies exist in the four pixel sub-units. Herein, assuming that a resonance frequency of the pixel sub-unit 221*a* is f1, a resonance frequency of the pixel sub-unit 221*b* is f2, a resonance frequency of the pixel sub-unit 221*c* is also f2, a resonance frequency of the pixel sub-unit 221*d* is f3, and a wave velocity of an optical wave is v, in this case, a first wavelength of the optical wave that can pass through the pixel sub-unit 221*a* is V/f1, a second wavelength of the optical wave that can pass through the pixel sub-unit 221*b* and the pixel sub-unit 221*c* is V/f2, and a third wavelength of the optical wave that can pass through the pixel sub-unit 221*d* is V/f3.

During actual operating, the optical source 51 is configured to provide a source optical wave for the spatial light modulator 52. The spatial light modulator 52 is configured to process the source optical wave through the phase change material layer 521 and each pixel unit in the first metasurface layer 522 to obtain a plurality of first optical waves. One pixel unit in the first metasurface layer 522 correspondingly processes one first optical wave, and a color value of the first optical wave corresponding to any pixel unit in the plurality of pixel units in the first metasurface layer 522 is determined by a value of a voltage connected to a partial phase change material layer corresponding to each pixel sub-unit included in the any pixel unit.

Figure 15:
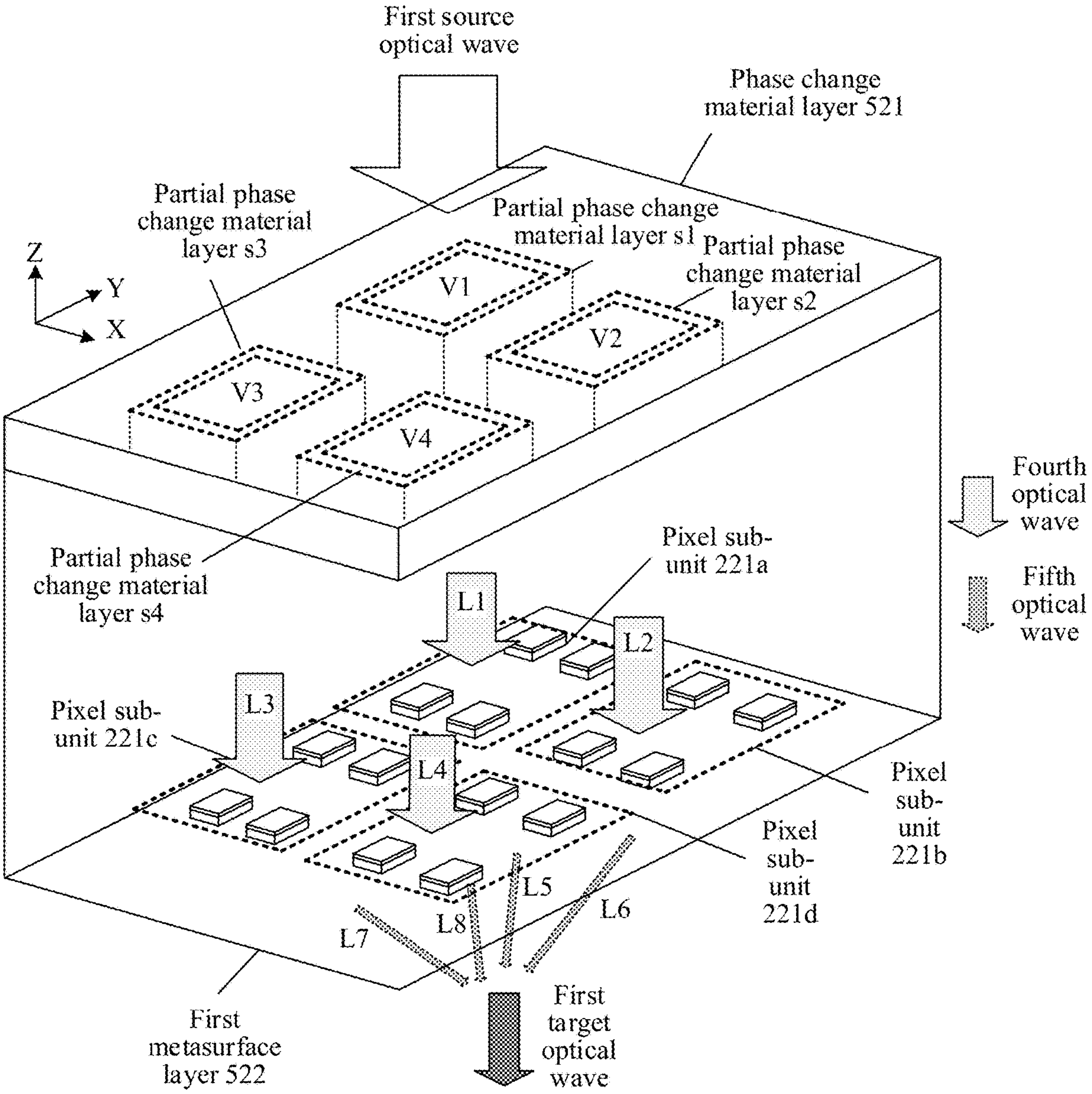
FIG. 15 is a schematic diagram of an operating principle of a spatial light modulator according to an embodiment of this application.

The following uses the first pixel unit 5221 as an example to describe an operating principle of the phase change material layer 521 and each pixel unit in the first metasurface layer 522. FIG. 15 is a schematic diagram of an operating principle of a spatial light modulator according to an embodiment of this application. As shown in FIG. 15, each pixel sub-unit corresponds to a partial phase change material layer of a partial phase change material layer 521. For example, the pixel sub-unit 221*a* corresponds to a partial phase change material layer s1, the pixel sub-unit 221*b* corresponds to a partial phase change material layer s2, the pixel sub-unit 221*c* corresponds to a partial phase change material layer s3, and the pixel sub-unit 221*d* corresponds to a partial phase change material layer s4. It should be noted herein that the partial phase change material layer corresponding to each pixel sub-unit refers to a part of an area that is included between an upper surface and a lower surface of the phase change material layer 521 and that is in contact with each pixel sub-unit. For ease of drawing, FIG. 15 shows only a part of each partial phase change material layer. An optical wave received or sent by a partial phase change material layer corresponding to a pixel sub-unit comes from or arrives at the pixel sub-unit only. For example, for the partial phase change material layer s1 corresponding to the pixel sub-unit 221*a*, in a scenario in which the spatial light modulator 52 is of a transmissive type, an optical wave modulated by the partial phase change material layer s1 arrives at the pixel sub-unit 221*a* only, and is not sent to another pixel sub-unit. In addition, in a scenario in which the spatial light modulator 52 is of a reflective type, the optical wave obtained through first phase modulation of the partial phase change material layer s1 arrives at the pixel sub-unit 221*a* only, and is not sent to another pixel sub-unit. The optical wave transmitted back by the pixel sub-unit 221*a* also arrives at the partial phase change material layer s1 only, and the partial phase change material layer s1 performs second phase modulation on the optical wave. In addition, the partial phase change material layer corresponding to each pixel sub-unit is separately powered, and optical intensity of an optical wave that passes through the pixel sub-unit is controlled based on a value of a voltage of a power supply. For example, a voltage V1 is connected to the partial phase change material layer s1, and a molecular orientation of a material of the phase change material layer s1 or a refractive index of the phase change material layer s1 is changed under action of the voltage V1, so that optical intensity of an optical wave that passes through the phase change material layer s1 is controlled to be first preset optical intensity. Similarly, a voltage V2 is connected to the partial phase change material layer s2, and optical intensity of an optical wave that passes through the partial phase change material layer s2 is controlled to be second preset optical intensity under action of the voltage V2. A voltage V3 is connected to the partial phase change material layer s3, and optical intensity of an optical wave that passes through the partial phase change material layer s3 is controlled to be third preset optical intensity under action of the voltage V3. A voltage V4 is connected to the partial phase change material layer s4, and optical intensity of an optical wave that passes through the partial phase change material layer s4 is controlled to be fourth preset optical intensity under action of the voltage V4.

During actual operating, some source optical waves received by the spatial light modulator 52 are simultaneously illuminated on the partial phase change material layer s1, the partial phase change material layer s2, the partial phase change material layer s3, and the partial phase change material layer s4. With reference to the foregoing assumption, under action of the voltage V1, the partial phase change material layer s1 may process a first source optical wave received by the partial phase change material layer s1 into a fourth optical wave L1 of the first preset optical intensity, and send the fourth optical wave L1 to the pixel sub-unit 221*a*. Then, the pixel sub-unit 221*a* resonates the fourth optical wave L1, and filters out light of wavelengths other than the first wavelength from the fourth optical wave L1 to obtain a fifth optical wave L5. A wavelength of the fifth optical wave L5 is the first wavelength, and optical intensity of the fifth optical wave L5 is the first preset optical intensity. Similarly, under action of the voltage V2, the partial phase change material layer s2 may process a second source optical wave received by the partial phase change material layer s2 into a fourth optical wave L2 of the second preset optical intensity, and send the fourth optical wave L2 to the pixel sub-unit 221*b*. Then, the pixel sub-unit 221*b* resonates the fourth optical wave L2, and filters out light of wavelengths other than the second wavelength from the fourth optical wave L2 to obtain a fifth optical wave L6. A wavelength of the fifth optical wave L6 is the second wavelength, and optical intensity of the fifth optical wave L6 is the second preset optical intensity. Under action of the voltage V3, the partial phase change material layer s3 may process a third source optical wave received by the partial phase change material layer s3 into a fourth optical wave L3 of third preset optical intensity, and send the fourth optical wave L3 to the pixel sub-unit 221*c*. Then, the pixel sub-unit 221*c* resonates the fourth optical wave L3, and similarly filters out light of wavelengths other than the second wavelength from the fourth optical wave L3 to obtain a fifth optical wave L7. A wavelength of the fifth optical wave L7 is the second wavelength, and optical intensity of the fifth optical wave L7 is the third preset optical intensity. Under action of the voltage V4, the partial phase change material layer s4 may process a fourth source optical wave received by the partial phase change material layer s4 into a fourth optical wave L4 of fourth preset optical intensity, and send the fourth optical wave L4 to the pixel sub-unit 221*d*. Then, the pixel sub-unit 221*d* resonates the fourth optical wave L4, and filters out light of wavelengths other than the third wavelength from the fourth optical wave L4 to obtain a fifth optical wave L8. A wavelength of the fifth optical wave L8 is the third wavelength, and optical intensity of the fifth optical wave L8 is the fourth preset optical intensity. Further, the pixel sub-unit 221*a*, the pixel sub-unit 221*b*, the pixel sub-unit 221*c*, and the pixel sub-unit 221*d* respectively emit the fifth optical wave L5, the fifth optical wave L6, the fifth optical wave L7, and the fifth optical wave L8 at a deflection angle, so that the fifth optical wave L5, the fifth optical wave L6, the fifth optical wave L7, and the fifth optical wave L8 are combined to obtain a first target optical wave of a color value corresponding to the first pixel unit 5221. It may be understood herein that the color value of the first target optical wave may be determined based on the optical intensity of the fifth optical wave L5, the fifth optical wave L6, the fifth optical wave L7, and the fifth optical wave L8.

In short, during actual operating, the spatial light modulator 52 controls, through each pixel sub-unit included in each pixel unit on the first metasurface layer 522 and a partial phase change material layer that is of a phase change material layer 521 and that corresponds to each pixel sub-unit, a proportion of optical waves of different wavelengths that respectively pass through the pixel units, to control a color value of a target optical wave that is correspondingly processed by each pixel unit, so that a pixel corresponding to each pixel unit on the screen 54 displays a corresponding color.

In addition, the spatial light modulator 52 may further send the plurality of first optical waves obtained by the spatial light modulator 52 to the lens 53. The lens 53 is configured to perform focus adjustment on these first optical waves, and transmit the plurality of first optical waves obtained through the focus adjustment to the screen 54, so that the screen 54 can display the plurality of first optical waves. It should be noted herein that a plurality of pixels exist on the screen 54, and each pixel correspondingly receives one first optical wave. In this way, after the plurality of first optical waves arrive at the screen 54, the plurality of pixels on the screen 54 may present a color corresponding to each first optical wave, to implement a projection and display function.

In an embodiment, the first metasurface layer including the plurality of pixel units is disposed in the spatial light modulator included in the projection system, and the plurality of pixel sub-units of different resonance frequencies are designed in each pixel unit. In this way, the spatial light modulator 100 can implement a better color tuning effect based on the phase change material layer 521 and the first metasurface layer 522 that is designed in a differentiated manner, and improve overall performance of the projection system 500. In addition, this specially designed spatial light modulator requires a smaller drive voltage and has a faster color tuning speed.

Figure 16:
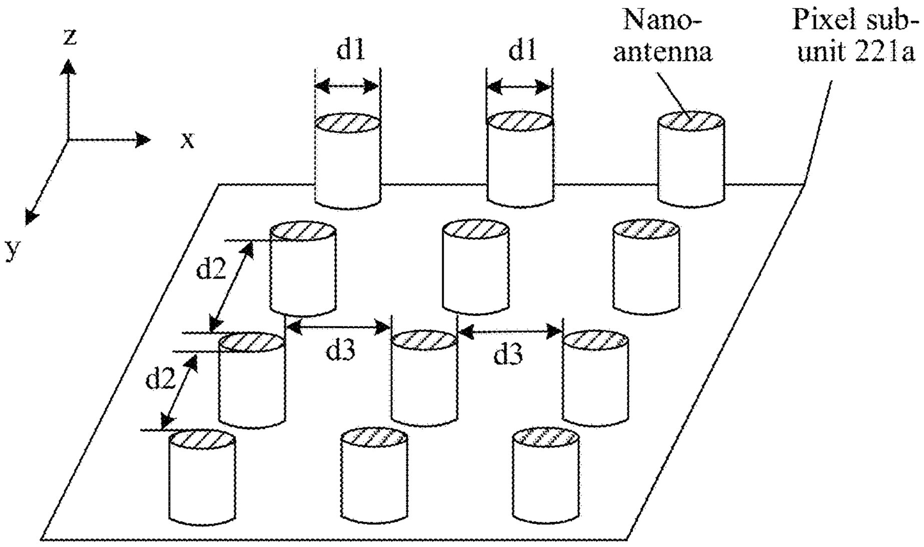
FIG. 16 is a schematic diagram of a structure of a pixel sub-unit according to an embodiment of this application.

In an embodiment, FIG. 16 is a schematic diagram of a structure of a pixel sub-unit according to an embodiment of this application. As shown in FIG. 16, the pixel sub-unit 221*a* is used as an example. The pixel sub-unit 221*a* is formed by uniformly arranging at least four nano-antennas, each nano-antenna is in a cylindrical shape, and each nano-antenna has a same size. In addition, a diameter (d1 shown in FIG. 16) of each nano-antenna is greater than or equal to 1% of a preset wavelength corresponding to a first pixel sub-unit 221*a*, and is less than or equal to the preset wavelength. Herein, the preset wavelength corresponds to a resonance frequency f1 of the first pixel sub-unit 221*a*, and the preset wavelength is the first wavelength (that is, V/f1) of the optical wave that can pass through the pixel sub-unit 221*a* described above, that is, $V/(100*f1) \le d1 \le V/f1$. A spacing between any two adjacent nano-antennas in the at least four nano-antennas is greater than or equal to 1% of the preset wavelength, and is less than or equal to the preset wavelength. Herein, it should be noted that mainly two types of spacings between the nano-antennas are included. One is a spacing (for example, d3 shown in FIG. 16) between any two adjacent nano-antennas in the first direction x, and the other is a spacing (for example, d2 shown in FIG. 16) between any two adjacent nano-antennas in the second direction y. Both the spacings should meet the foregoing requirements, that is, $V/(100*f1) \le d2 \le V/f1$ and $V/(100*f1) \le d3 \le V/f1$.

It should be noted that, in an embodiment, only a structure of the nano-antenna in the pixel sub-unit 221*a* is described. However, in an embodiment, pixel sub-units in the first metasurface layer 522 other than the pixel sub-unit 221*a* may also use a similar structure. This is not listed herein again.

Further, when the nano-antenna is in the cylindrical shape, preferably, an axial direction of each nano-antenna is parallel to the third direction z.

In an embodiment, the nano-antenna in the pixel sub-unit is designed in the cylindrical shape, and the diameter of the nano-antenna and a value range of the spacing between adjacent nano-antennas are further designed based on the wavelength of the optical wave that can pass through the pixel sub-unit. In this way, light filtering performance of the pixel sub-unit can be effectively ensured, color tuning performance of the spatial light modulator 52 can be ensured, and the overall performance of the projection system 500 is improved.

Figure 17:
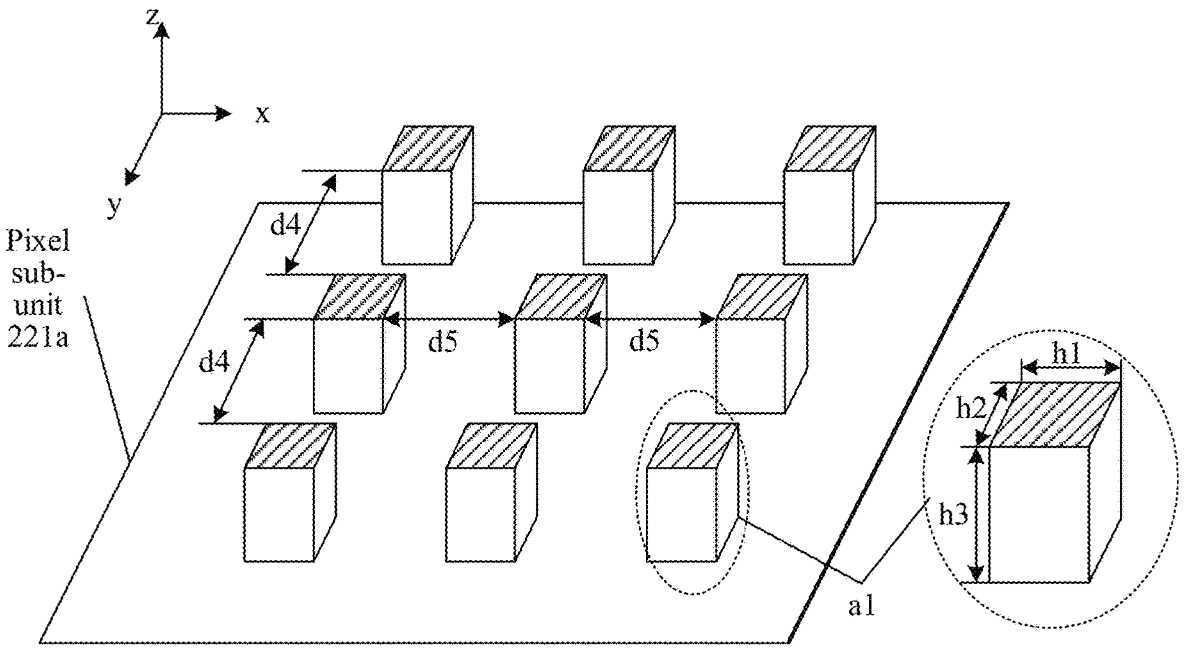
FIG. 17 is another schematic diagram of a structure of a pixel sub-unit according to an embodiment of this application.

In an embodiment, FIG. 17 is another schematic diagram of a structure of a pixel sub-unit according to an embodiment of this application. As shown in FIG. 17, the pixel sub-unit 221*a* may be formed by uniformly arranging at least four cuboid nano-antennas of a same size. In addition, each side length of each nano-antenna is greater than or equal to 1% of the preset wavelength corresponding to the first pixel sub-unit, and is less than or equal to the preset wavelength. Herein, for descriptions of the preset wavelength, refer to the foregoing descriptions. Details are not described herein again. For example, a nano-antenna a1 included in the pixel sub-unit 221*a* is used as an example. Side lengths of the nano-antenna a1 may include a side length h1 in the first direction x, a side length h2 in the second direction y, and a side length h3 in the third direction z. Values of the side length h1, the side length h2, and the side length h3 are all greater than or equal to 1% of the preset wavelength, and are less than or equal to the preset wavelength, that is, $V/(100*f1) \le h1 \le V/f1$, $V/(100*f1) \le h2 \le V/f1$, and $V/(100*f1) \le h3 \le V/f1$. In addition, a spacing between any two adjacent nano-antennas in the pixel sub-unit 221*a* is greater than or equal to 1% of the preset wavelength, and is less than or equal to the preset wavelength. Herein, it should be noted that mainly two types of spacings between the nano-antennas are included. One is a spacing (d5 shown in FIG. 17) between any two adjacent nano-antennas in the first direction x, and the other is a spacing (d4 shown in FIG. 17) between any two adjacent nano-antennas in the second direction y. Both the spacings should meet the foregoing requirements, that is, $V/(100*f1) \le d4 \le V/f1$ and $V/(100*f1) \le d5 \le V/f1$.

It should be noted that, in an embodiment, only a structure of the nano-antenna in the pixel sub-unit 221*a* is described. However, in an embodiment, pixel sub-units in the first metasurface layer 522 other than the pixel sub-unit 221*a* may also use a similar structure. This is not listed herein again.

In an embodiment, the nano-antenna in the metasurface unit is designed in the cuboid shape, and the preset wavelength of the pixel sub-unit limits a value range of each side length of the nano-antenna, so that the design of the cuboid nano-antenna may optimize an orientation of the phase change material layer 521, effectively ensure light filtering performance of the pixel sub-unit, and ensure color tuning performance of the spatial light modulator 52.

It should be noted herein that the nano-antenna in an embodiment may be a dielectric antenna or a metal antenna. The dielectric antenna refers to a nano-antenna made of a low-loss high-frequency dielectric material (such as polystyrene), and may be used to conduct an electromagnetic wave (such as an optical wave). The metal antenna refers to a nano-antenna made of a material, for example, gold, silver, or copper, and may also be used to conduct an electromagnetic wave.

It should be further noted herein that the foregoing describes the structure of each pixel sub-unit (for example, the pixel sub-unit 221*a*) by using an example in which the nano-antennas included in the pixel sub-unit are in a same shape. In an embodiment, a plurality of nano-antennas in a same pixel sub-unit may be alternatively in different shapes. For example, a part of nano-antennas included in the pixel sub-unit 221*a* may be in the cuboid shape, and another part of nano-antennas included in the pixel sub-unit 221*a* may be in the cylindrical shape. In other words, the shapes of the plurality of nano-antennas included in the pixel sub-unit in an embodiment may be the same, or may be different. This is not limited herein.

Figure 18:
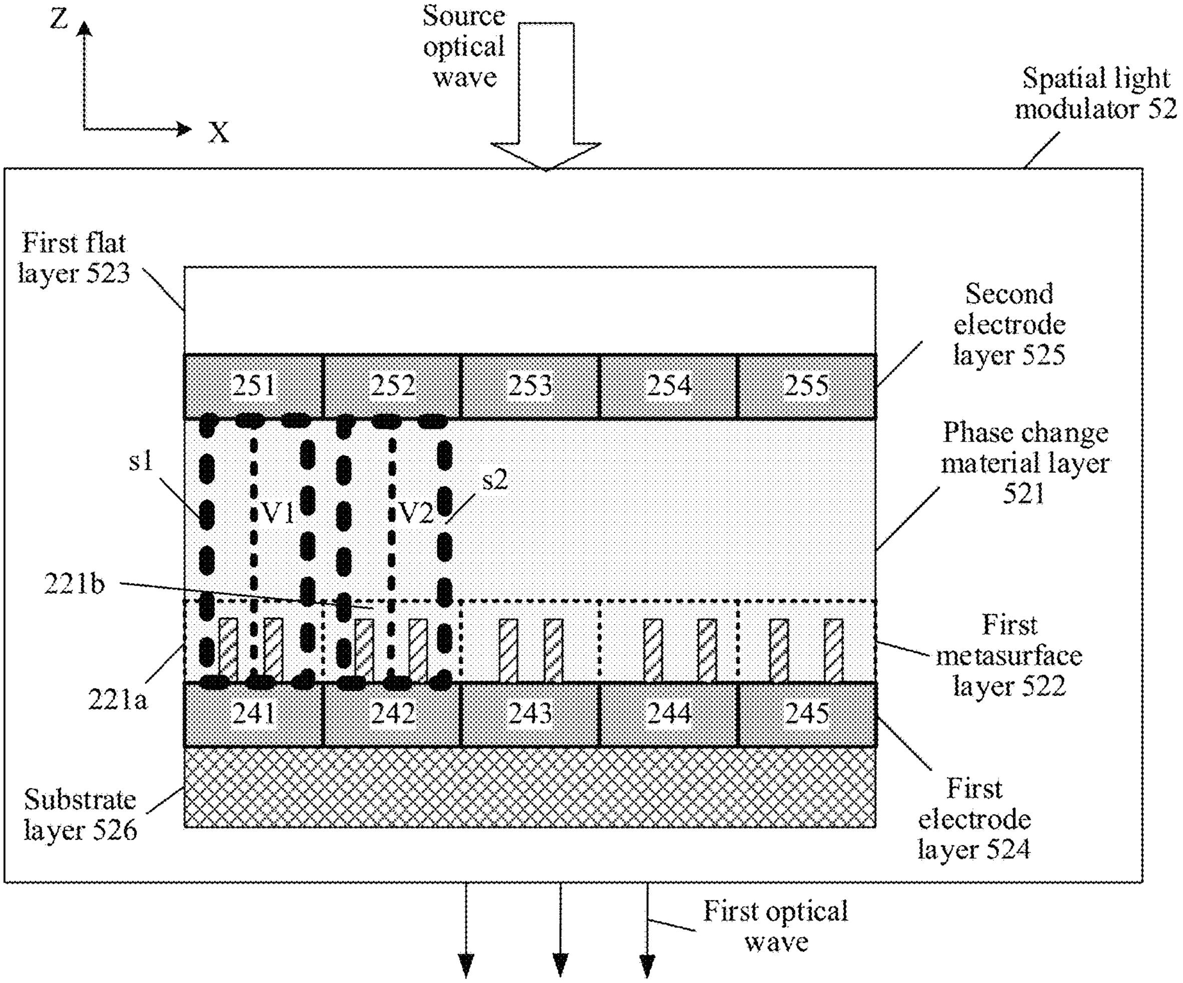
FIG. 18 is a schematic diagram of a structure of another spatial light modulator according to an embodiment of this application.

In an embodiment, FIG. 18 is a schematic diagram of a structure of another spatial light modulator according to an embodiment of this application. As shown in FIG. 18, the spatial light modulator 52 further includes a first flat layer 523, a first electrode layer 524, a second electrode layer 525, and a substrate layer 526, and these layer structures are disposed together in a stacking manner. In an embodiment, the substrate layer 526 and the first flat layer 523 are parallel to each other, and the first electrode layer 524 and the second electrode layer 525 are respectively disposed on opposite sides of the substrate layer 526 and the first flat layer 523 (in other words, the first electrode layer 524 is disposed on a side that is of the substrate layer 526 and that faces the first flat layer 523, and the second electrode layer 525 is disposed on a side that is of the first flat layer 523 and that faces the substrate layer 526). The first metasurface layer 522 and the phase change material layer 521 are disposed between the first electrode layer 524 and the second electrode layer 525. In addition, the first electrode layer 524 may include a plurality of first electrodes, and the second electrode layer 525 may include a plurality of second electrodes. The plurality of first electrodes and the plurality of second electrodes form a plurality of electrode pairs (where one first electrode and one second electrode form one electrode pair). At least one of the plurality of electrode pairs corresponds to one pixel sub-unit in the first metasurface layer 522, and supplies power for a partial phase change material layer corresponding to the pixel sub-unit. For example, as shown in FIG. 18, the plurality of first electrodes may include a first electrode 241, a first electrode 242, a first electrode 243, a first electrode 244, and a first electrode 245, and the plurality of second electrodes may include a second electrode 251, a second electrode 252, a second electrode 253, a second electrode 254, and a second electrode 255. The five first electrodes and the five second electrodes form five electrode pairs. The five electrode pairs include an electrode pair that corresponds to the pixel sub-unit 221*a* and that includes the first electrode 241 and the second electrode 251 (for ease of differentiation, the following uses a first electrode pair as a substitute for description). The first electrode pair may be configured to provide the voltage V1 for the partial phase change material layer s1 corresponding to the pixel sub-unit 221*a*. Similarly, the five electrode pairs further include an electrode pair that corresponds to the pixel sub-unit 221*b* and that includes the first electrode 242 and the second electrode 252 (for ease of differentiation, the following uses a second electrode pair as a substitute for description). The second electrode pair may be configured to provide the voltage V2 for the partial phase change material layer s2 corresponding to the pixel sub-unit 221*b*.

During actual operating, the first electrode layer 524 and the second electrode layer 525 need to be powered on first, so that a voltage difference exists between the electrode pairs. In this way, a voltage difference exists at two ends of each partial phase change material layer of a phase change material layer 13, so that each partial phase change material layer can control, by changing a molecular orientation of a material or a refractive index, optical intensity of an optical wave that passes through the partial phase change material layer. After the first electrode layer 524 and the second electrode layer 525 are powered on, the source optical wave received by the spatial light modulator 52 arrives at the phase change material layer 521 through the first flat layer 523, and then is jointly processed by the phase change material layer 521 and the first metasurface layer 522, to obtain a plurality of first optical waves.

It should be additionally noted herein that, in a scenario in which the spatial light modulator 52 is a transmissive spatial light modulator, both the second electrode layer 525 and the first electrode layer 524 may be transmissive electrode layers (that is, transparent electrode layers). The plurality of optical waves obtained by processing the phase change material layer 521 and the first metasurface layer 522 are the first optical waves, and the plurality of first optical waves are also propagated to an outside of the spatial light modulator 52 through the first electrode layer 524 and the substrate layer 526. In a scenario in which the spatial light modulator 52 is a reflective spatial light modulator, the first electrode layer 524 is a reflective electrode layer. However, the optical waves processed by the phase change material layer 521 and the first metasurface layer 522 once are not the first optical waves described above. These optical waves are reflected back to the first metasurface layer 522 by the first electrode layer 524, and then are processed by the first metasurface layer 522 and the phase change material layer 521 again to obtain most of the first optical waves described above. Then, the plurality of first optical waves are propagated to the outside of the spatial light modulator 52 through the second electrode layer 525 and the first flat layer 523. It should be understood herein that the foregoing FIG. 14, FIG. 15, and FIG. 18 are all described by using the transmissive spatial light modulator as an example. For the spatial light modulator 52, in terms of structure, a difference between the reflective and transmissive types mainly lies in whether the first electrode layer 524 is a transmissive electrode layer, and in terms of function, a difference between the reflective and transmissive types mainly lies in whether same processing needs to be performed twice by the phase change material layer 521 and the first metasurface layer 522 on the optical wave that passes through the phase change material layer 521 and the first metasurface layer 522. Based on this, to avoid repetition, when the following describes another structure and function of the spatial light modulator 52, a scenario of the transmissive spatial light modulator is used as an example.

In an embodiment, the first metasurface layer 522 may be included on a side that is of the phase change material layer 521 and that faces the first electrode layer, and is in contact with the first electrode layer.

It should be understood that, because the phase change material layer 521 is a fluid, the first metasurface layer 522 is formed by arranging a plurality of nano-antennas, and a gap exists between the nano-antennas, the first metasurface layer 522 and the phase change material layer 521 may be disposed in an embedding manner, but the first metasurface layer 522 is not completely included in the phase change material layer 521. A surface of a side that is of each nano-antenna included in the first metasurface layer 522 and that faces the first electrode layer 524 is in direct contact with the first electrode layer 524 through the phase change material layer 521. For example, as shown in FIG. 14, the first metasurface layer 522 is embedded with a side that is of the phase change material layer 521 and that faces the first electrode layer 524, and is in contact with the first electrode layer 524 through the phase change material layer 521.

Figure 19:
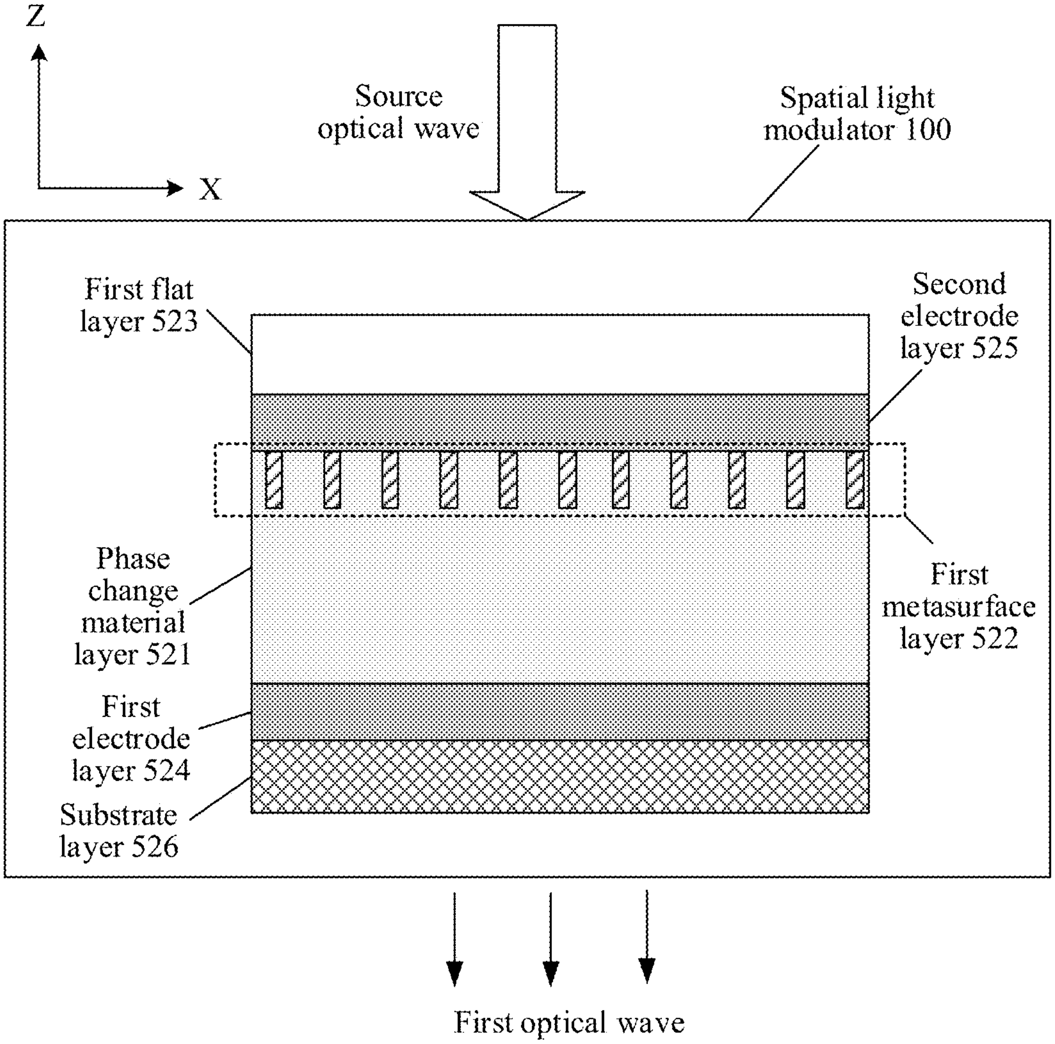
FIG. 19 is another schematic diagram of a structure of another spatial light modulator according to an embodiment of this application.

Alternatively, FIG. 19 is another schematic diagram of a structure of another spatial light modulator according to an embodiment of this application. As shown in FIG. 19, the first metasurface layer 522 may alternatively be included on a side that is of the phase change material layer 521 and that faces the second electrode layer 525, and is in contact with the second electrode layer 525. Similar to the foregoing descriptions, the inclusion means that the first metasurface layer 522 is embedded with the side that is of the phase change material layer 521 and that faces the second electrode layer 525, and is not completely included in the phase change material layer 521.

Figure 20:
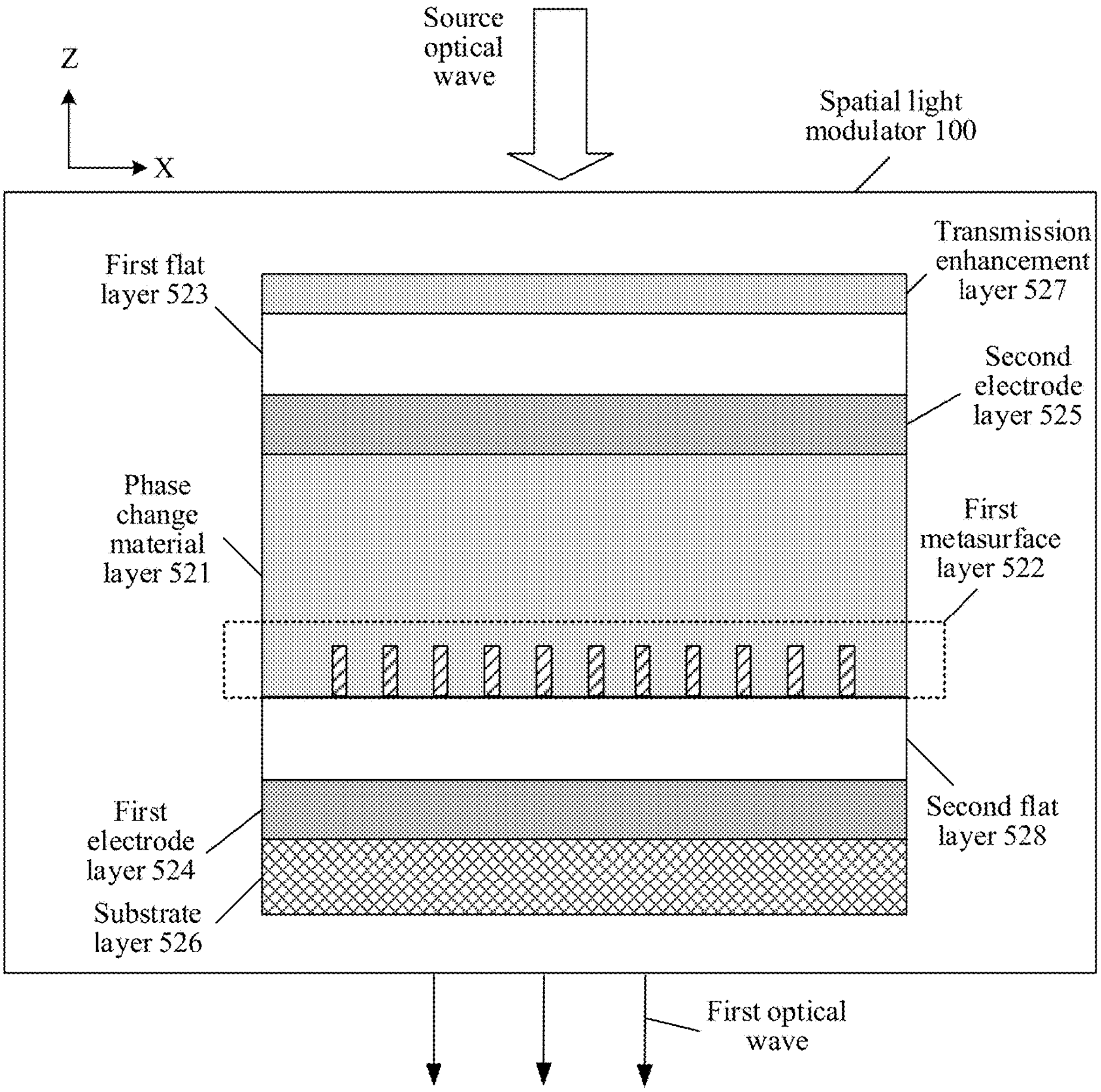
FIG. 20 is another schematic diagram of a structure of another spatial light modulator according to an embodiment of this application.

In an embodiment, FIG. 20 is another schematic diagram of a structure of another spatial light modulator according to an embodiment of this application. As shown in FIG. 20, the spatial light modulator 52 may further include a transmission enhancement layer 527 and a second flat layer 528. The transmission enhancement layer 527 may be disposed on a side that is of the first flat layer 523 and that is away from the second electrode layer 525. In other words, the transmission enhancement layer 527 may be disposed on a face that is of the first flat layer 523 and that is away from the second electrode layer 525, and is attached to the first flat layer 523. The second flat layer 528 may be disposed between the phase change material layer 521 and the first electrode layer 524. In addition, one face of the second flat layer 528 is in contact with the first electrode layer 524, and the other face of the second flat layer 528 is in contact with the phase change material layer 521 (when the first metasurface layer 522 is included in the phase change material layer 521 and faces the second electrode layer 525), or the other face of the second flat layer 528 is in contact with both the phase change material layer 521 and the first metasurface layer 522 (when the first metasurface layer 522 is included in the phase change material layer faces the first electrode layer 524).

During actual operating, the transmission enhancement layer 527 may be configured to increase an amount of incident light admitted by the spatial light modulator 52, and reduce an energy loss of the incident light. The second flat layer 528 is mainly configured to fasten, in combination with the first flat layer 523, a phase change material of the fluid included in the phase change material layer 521.

When the spatial light modulator 52 includes the second flat layer 528, in an embodiment, a position of the first metasurface layer 522 may be shown in FIG. 20, in other words, the first metasurface layer 522 may be included on the side of the phase change material layer 521 and that faces the first electrode layer 524, and is in direct contact with the second flat layer 528. Herein, similar to the foregoing descriptions, the first metasurface layer 522 is not completely included in the phase change material layer 521, but a partial surface of the first metasurface layer 522 is in contact with the second flat layer 528 through the phase change material layer 521.

In an embodiment, as described above, the first metasurface layer 522 may alternatively be included on the side that is of the phase change material layer 521 and that faces the second electrode layer 525, and is in contact with the second electrode layer 525.

Figure 21:
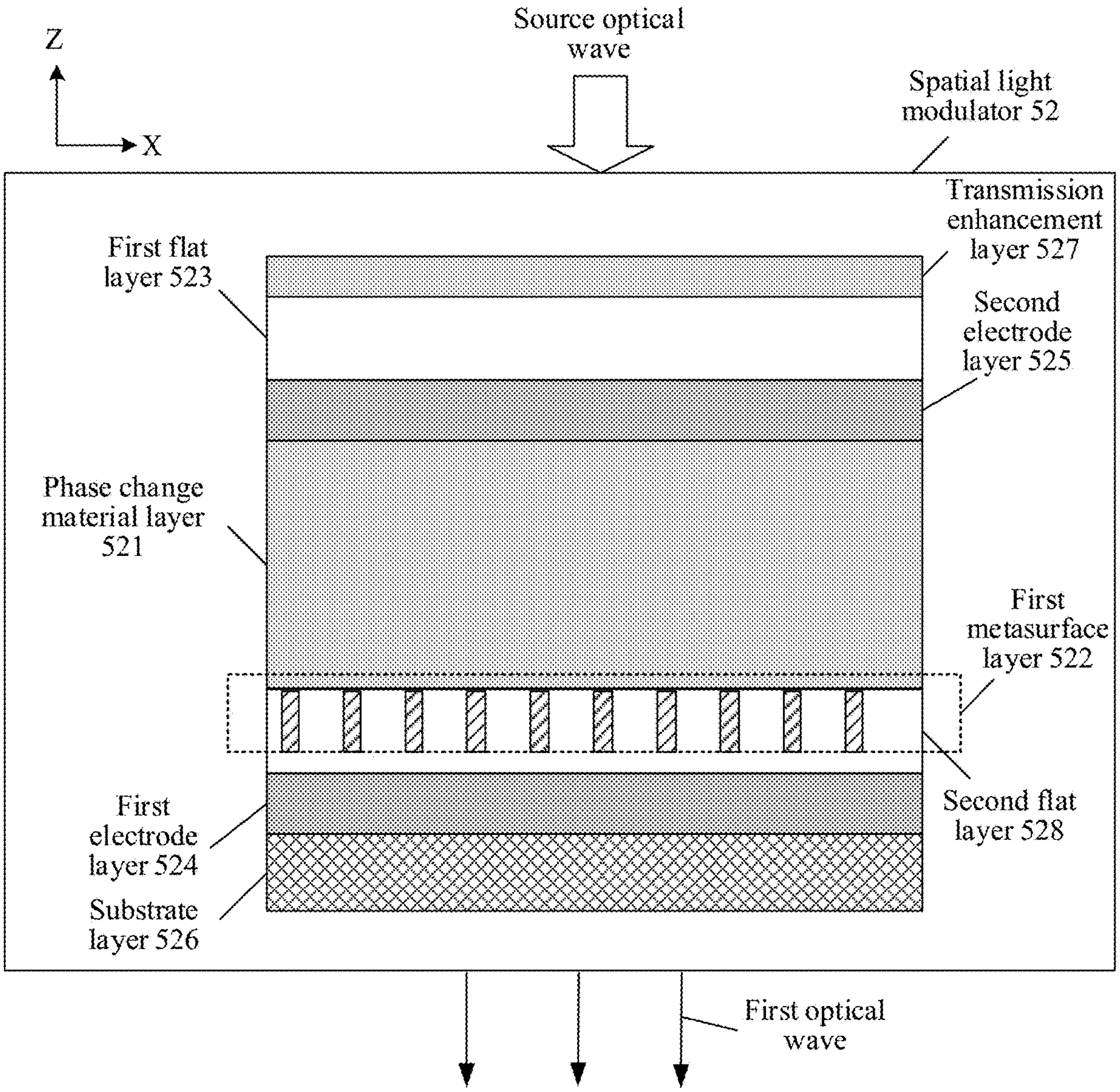
FIG. 21 is another schematic diagram of a structure of another spatial light modulator according to an embodiment of this application.

In an embodiment, FIG. 21 is another schematic diagram of a structure of another spatial light modulator according to an embodiment of this application. As shown in FIG. 21, the first metasurface layer 522 may alternatively be included on a side that is of the second flat layer 528 and that faces the phase change material layer 521, and is in contact with the phase change material layer 521. It should also be understood herein that the inclusion means that the first metasurface layer 522 is embedded with the side that is of the second flat layer 528 and that faces the phase change material layer 521, and is not completely included in the second flat layer 528. In an embodiment, the first metasurface layer 522 is disposed in the second flat layer 528. In this way, impact of the first metasurface layer 522 on a molecular orientation of a material of the phase change material layer 521 can be reduced, and phase change performance of the phase change material layer 521 can be improved.

Figure 22:
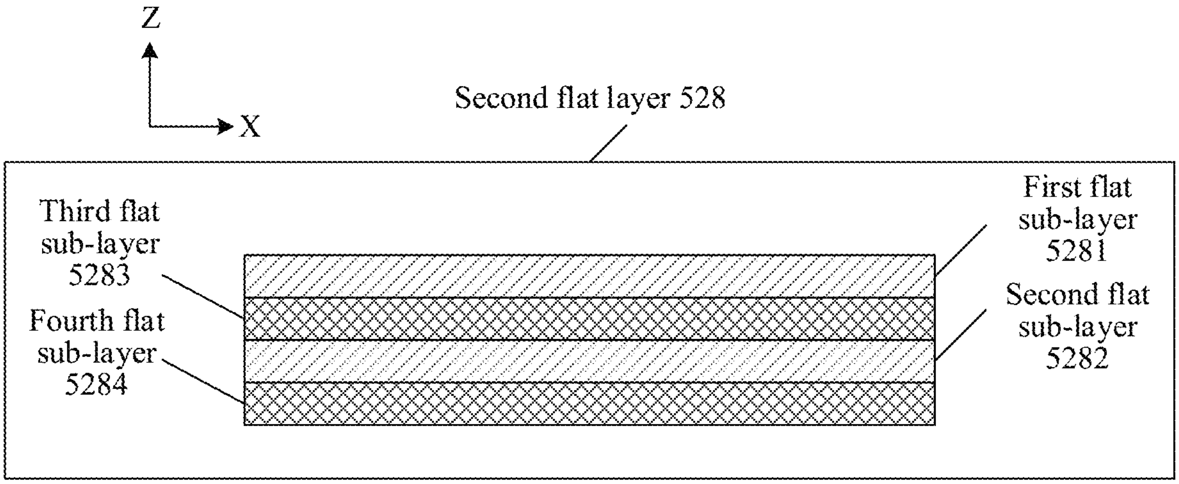
FIG. 22 is a schematic diagram of a structure of another second flat layer according to an embodiment of this application.

Further, the second flat layer 528 may include at least two stacked flat sub-layers, and any two adjacent flat sub-layers in the at least two stacked flat sub-layers have different refractive indexes. It should be understood herein that, for any two non-adjacent flat sub-layers included in the second flat layer 528, refractive indexes of the two flat sub-layers may be the same or may be different. This is not limited in this application. For example, FIG. 22 is a schematic diagram of a structure of another second flat layer according to an embodiment of this application. As shown in FIG. 22, it is assumed that the second flat layer 528 is formed by stacking four flat sub-layers, and the four flat sub-layers include a first flat sub-layer 5281, a second flat sub-layer 5282, a third flat sub-layer 5283, and a fourth flat sub-layer 5284. A refractive index of the third flat sub-layer 5283 is different from refractive indexes of the first flat sub-layer 5281 and the second flat sub-layer 5282, and the refractive index of the second flat sub-layer 5282 is different from a refractive index of the fourth flat sub-layer 5284. The refractive indexes of the first flat sub-layer 5281 and the second flat sub-layer 5282 may be the same, or may be different. The refractive indexes of the third flat sub-layer 5283 and the fourth flat sub-layer 5284 may be the same, or may be different.

In an embodiment, assuming that a center wavelength of an operating wave range of the spatial light modulator 52 is a sixth wavelength $\lambda 6$, a thickness (which is assumed to be H0 herein) of each flat sub-layer included in the second flat layer 528 in the third direction z should be greater than or equal to one fiftieth of the sixth wavelength $\lambda 6$ and less than or equal to the sixth wavelength $\lambda 6$, that is, $\lambda 6/50 \leq H0 \leq \lambda 6$.

Figure 23:
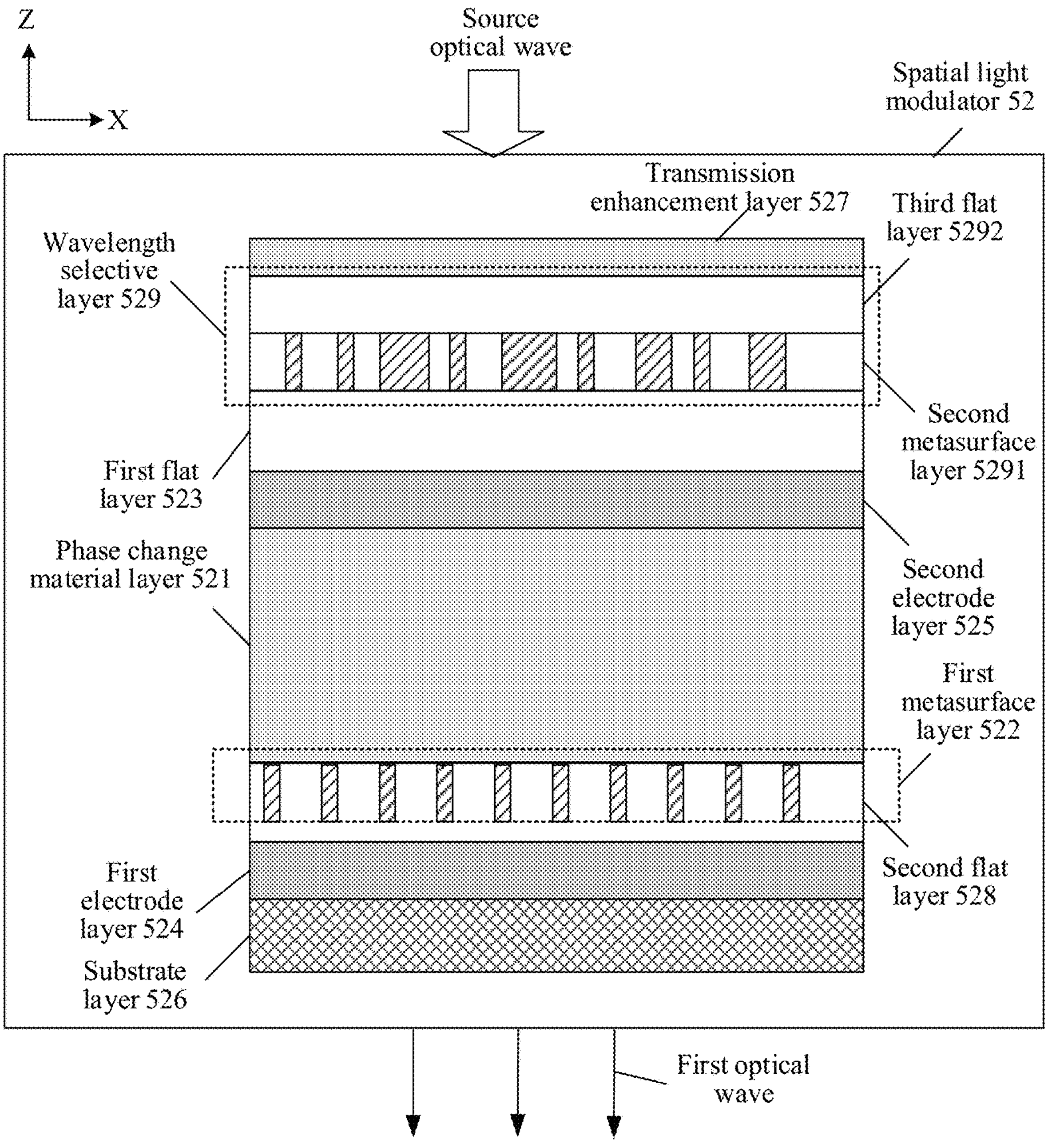
FIG. 23 is another schematic diagram of a structure of another spatial light modulator according to an embodiment of this application.

In an embodiment, FIG. 23 is another schematic diagram of a structure of another spatial light modulator according to an embodiment of this application. As shown in FIG. 23, the spatial light modulator 52 may further include a wavelength selective layer 529, and the wavelength selective layer 529 may be disposed on a side that is of the phase change material layer 521 and that faces away from the substrate layer 526. In other words, the wavelength selective layer 529 may be disposed at any position on the side that is of the phase change material layer 521 and that faces away from the substrate layer 526, provided that it is ensured that the incident optical wave of the spatial light modulator 52 arrives at the phase change material layer 521 through the wavelength selective layer 529. For example, as shown in FIG. 23, when the spatial light modulator 52 includes the transmission enhancement layer 527, the wavelength selective layer 529 may be disposed between the transmission enhancement layer 527 and the first flat layer 523.

During actual operating, the wavelength selective layer 529 is mainly configured to perform wavelength selection on the source optical wave received by the spatial light modulator 52 to obtain one or more optical waves of different wavelengths (for ease of differentiation, the following uses a third optical wave as a substitute for description), and send the one or more third optical waves to the phase change material layer 521. A resonance frequency of a pixel sub-unit corresponding to a partial phase change material layer of the phase change material layer 521 on which incidence of each of the one or more third optical waves occurs corresponds to the wavelength of each third optical wave. In other words, a wavelength that can pass through the pixel sub-unit corresponding to the partial phase change material layer on which incidence of each third optical wave occurs is the wavelength of each third optical wave. For example, with reference to the foregoing example of the pixel sub-unit, the wavelength selective layer 529 may be configured to select an optical wave of the first wavelength from the source optical waves, and send the optical wave of the first wavelength to the partial phase change material layer s1 that is included in the phase change material layer 521 and that corresponds to the pixel sub-unit 221*a*. For another example, the wavelength selective layer 529 may be further configured to select an optical wave of the second wavelength from the source optical waves, and send the optical wave of the second wavelength to the partial phase change material layer s2 that is included in the phase change material layer 521 and that corresponds to the pixel sub-unit 221*a*.

In an embodiment, the wavelength selective layer 529 is disposed on the side that is of the phase change material layer 521 and that faces away from the substrate layer 526. In this way, incident light of a wavelength can be sent to a partial phase change material layer corresponding to the wavelength in a centralized manner, to arrive at a pixel sub-unit through which the optical wave of the wavelength can pass as much as possible. In this way, efficiency of using energy of the source optical wave by the spatial light modulator 52 can be effectively improved, and power consumption of the spatial light modulator 52 is reduced.

In an embodiment, as shown in FIG. 23, the wavelength selective layer 529 may include a third flat layer 5292 and a second metasurface layer 5291. Both the third flat layer 5292 and the second metasurface layer 5291 are parallel to the first flat layer 523.

Preferably, the second metasurface layer 5291 may be formed by arranging a plurality of cuboid nano-antennas. Sizes and nano-antenna periods of the plurality of cuboid nano-antennas are not limited in this application.

It should be further noted herein that the plurality of nano-antennas included in the second metasurface layer 5291 may alternatively be in a cylindrical shape, an elliptical cylindrical shape, or another shape. This is not limited in this application. Similarly, the shapes of the plurality of nano-antennas included in the second metasurface layer 5291 may be the same, or may be different. This is not limited in this application either.

Figure 24:
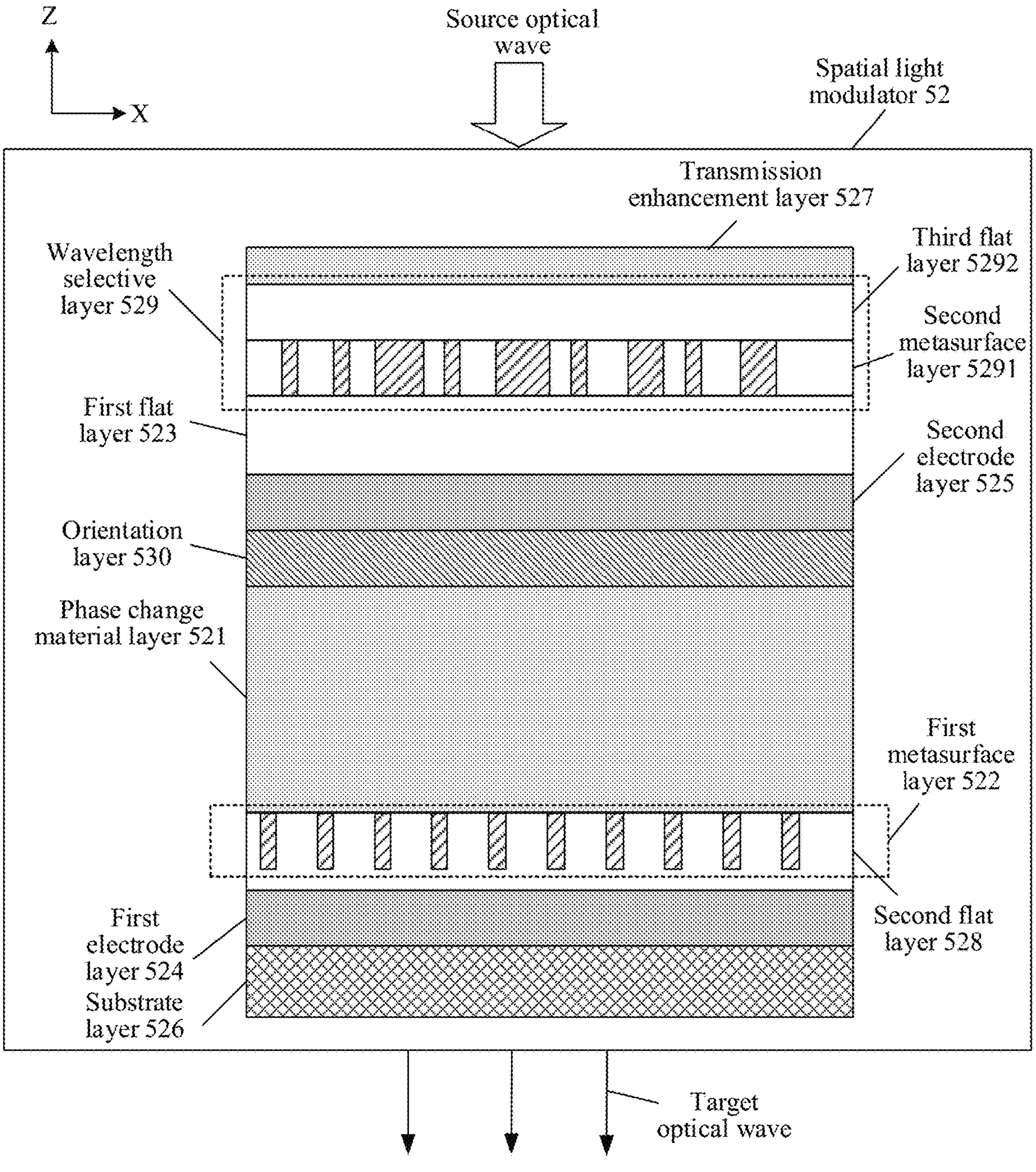
FIG. 24 is another schematic diagram of a structure of another spatial light modulator according to an embodiment of this application.

In an embodiment, FIG. 24 is another schematic diagram of a structure of another spatial light modulator according to an embodiment of this application. As shown in FIG. 24, the spatial light modulator 52 may further include an orientation layer 530. The orientation layer 530 is disposed on a side that is of the phase change material layer 521 and that faces away from the first metasurface layer 522. In other words, the orientation layer 530 is disposed on a surface that is of the phase change material layer 521 and that is away from the first metasurface layer 522, and is in contact with the surface. As shown in FIG. 24, the side that is of the phase change material layer 521 and that faces away from the first metasurface layer 522 is a side that is of the phase change material layer 521 and that faces the second electrode layer 525. Therefore, the orientation layer 530 may be disposed between the second electrode layer 525 and the phase change material layer 521.

During actual operating, the orientation layer 530 is configured to control the molecular orientation of the material included in the phase change material layer 521, to ensure performance stability of the phase change material layer 521.

Figure 25:
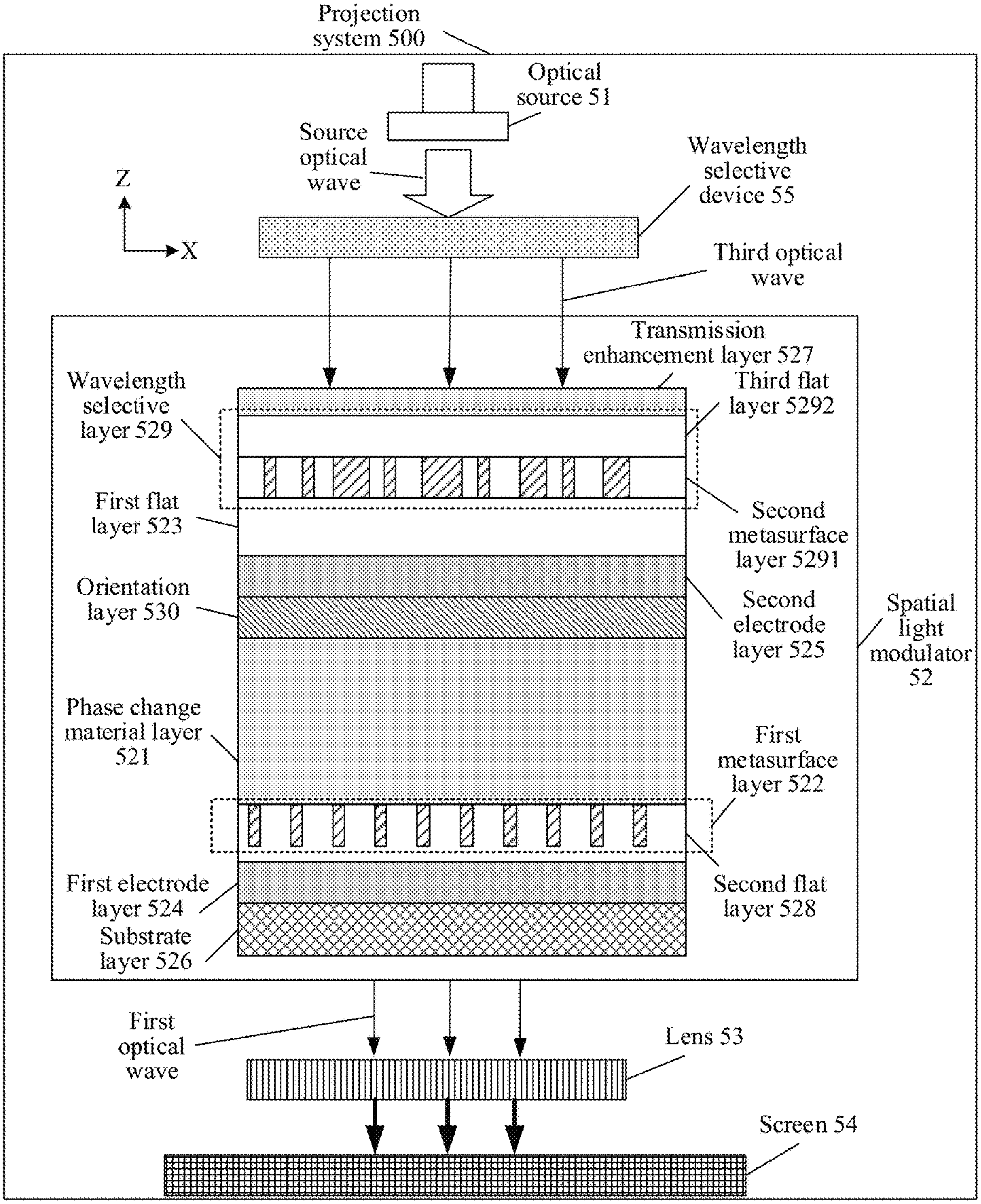
FIG. 25 is another schematic diagram of a structure of a projection system according to an embodiment of this application.

In an embodiment, FIG. 25 is another schematic diagram of a structure of a projection system according to an embodiment of this application. As shown in FIG. 25, the projection system 500 may further include a wavelength selective device 55. The wavelength selective device 55 may be disposed between the optical source 51 and the spatial light modulator 52. During actual operating, the wavelength selective device 55 may be configured to receive a source optical wave from the optical source 51, perform wavelength selection on the source optical wave to obtain one or more third optical waves of different wavelengths, and send the one or more third optical waves of different wavelengths to the spatial light modulator 52. It should be understood that, in this case, the incident light of the spatial light modulator 52 is no longer the source optical wave output by an optical source, but one or more third optical waves output by the wavelength selective device 55.

In an embodiment, the wavelength selective device 55 is disposed between the optical source 51 and the spatial light modulator 52. In this way, the incident light of the spatial light modulator 52 may be the third optical wave on which preliminary beam splitting is performed, so that the incident light of the spatial light modulator 52 can arrive at each pixel sub-unit as much as possible. In this way, efficiency of using energy by the spatial light modulator 52 can be effectively improved, and power consumption of the spatial light modulator 52 is reduced. In addition, filtering pressure of each pixel sub-unit may also be reduced.

In an embodiment, the wavelength selective device 55 may use a structure similar to a structure of the wavelength selective layer 529 described above, in other words, the wavelength selective device 55 may also be formed by a flat layer and a metasurface layer. Certainly, the wavelength selective device 55 may alternatively use another feasible structure. A structure of the wavelength selective device 55 is not limited in this application.

It should be further noted that, in an embodiment, the wavelength selective device 55 and the wavelength selective layer 529 may coexist, or only one of the wavelength selective device 55 and the wavelength selective layer 529 may be included. This is not limited in this application.

Figure 26:
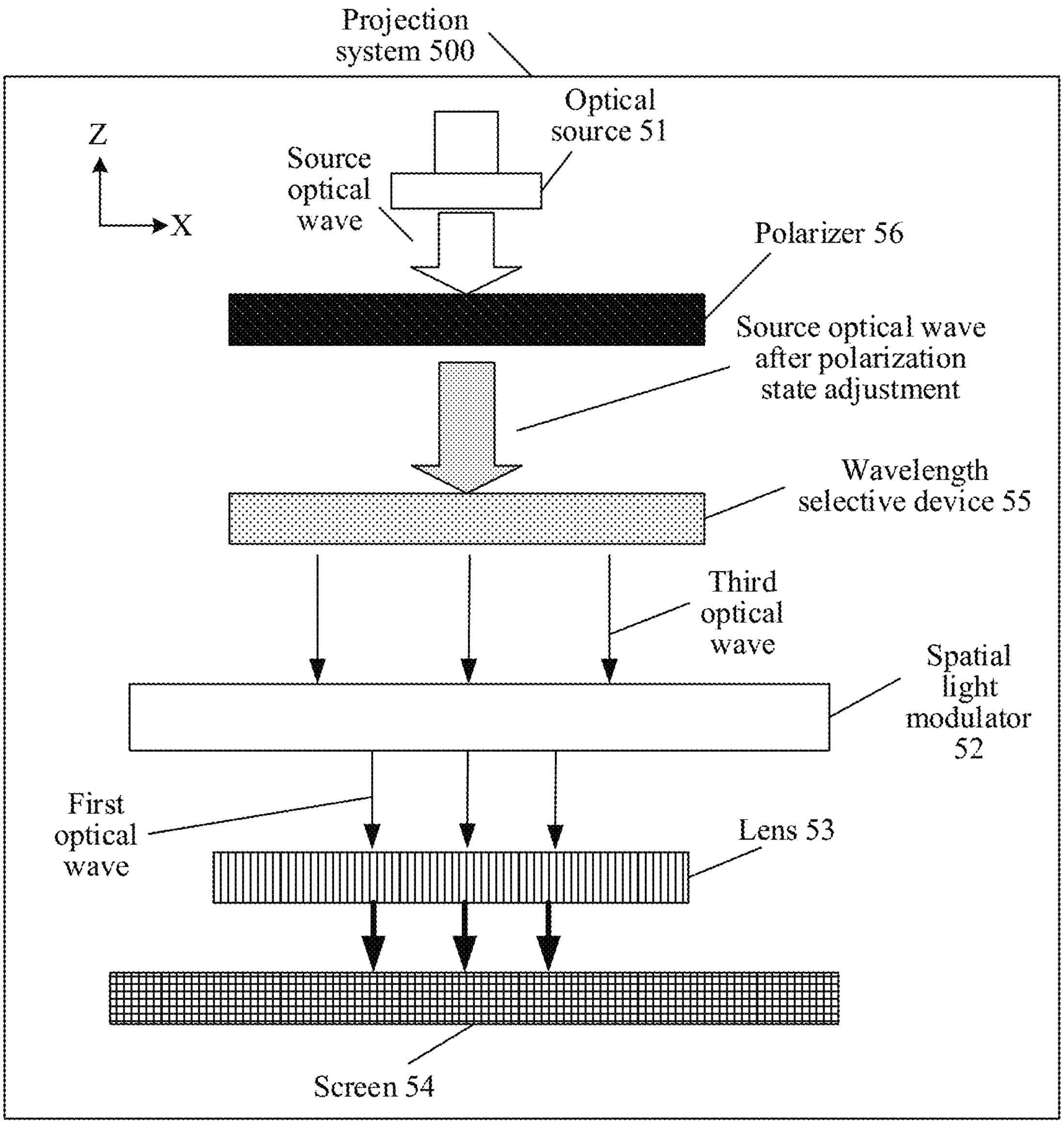
FIG. 26 is another schematic diagram of a structure of a projection system according to an embodiment of this application.

In an embodiment, FIG. 26 is another schematic diagram of a structure of a projection system according to an embodiment of this application. As shown in FIG. 26, the projection system 500 may further include a polarizer 56. The polarizer 56 may be disposed at any position between the optical source 51 and the spatial light modulator 52. As shown in FIG. 26, the polarizer 56 is disposed between the optical source 51 and the wavelength selective device 55. It should be understood that the polarizer 56 may alternatively be disposed between the wavelength selective device 55 and the spatial light modulator 52. In conclusion, for a position design of the polarizer 56, it only needs to be ensured that an optical wave provided by the optical source 51 can arrive at the spatial light modulator 52 through the polarizer 56. During actual operating, the polarizer 56 is mainly configured to perform polarization state adjustment on the source optical wave provided by the optical source 51, and send the source optical wave after the polarization state adjustment to the spatial light modulator 52. For example, when a position of the polarizer 56 is disposed as shown in FIG. 26, the polarizer 56 may be configured to perform polarization state adjustment on the source optical wave provided by the optical source 51, and send the source optical wave after the polarization state adjustment to the wavelength selective device 55.

In an embodiment, the polarizer 56 is disposed at any position between the optical source 51 and the spatial light modulator 52, so that the polarizer 56 can cooperate with the first metasurface layer 522, and the spatial light modulator 52 has a high extinction ratio.

Figure 27:
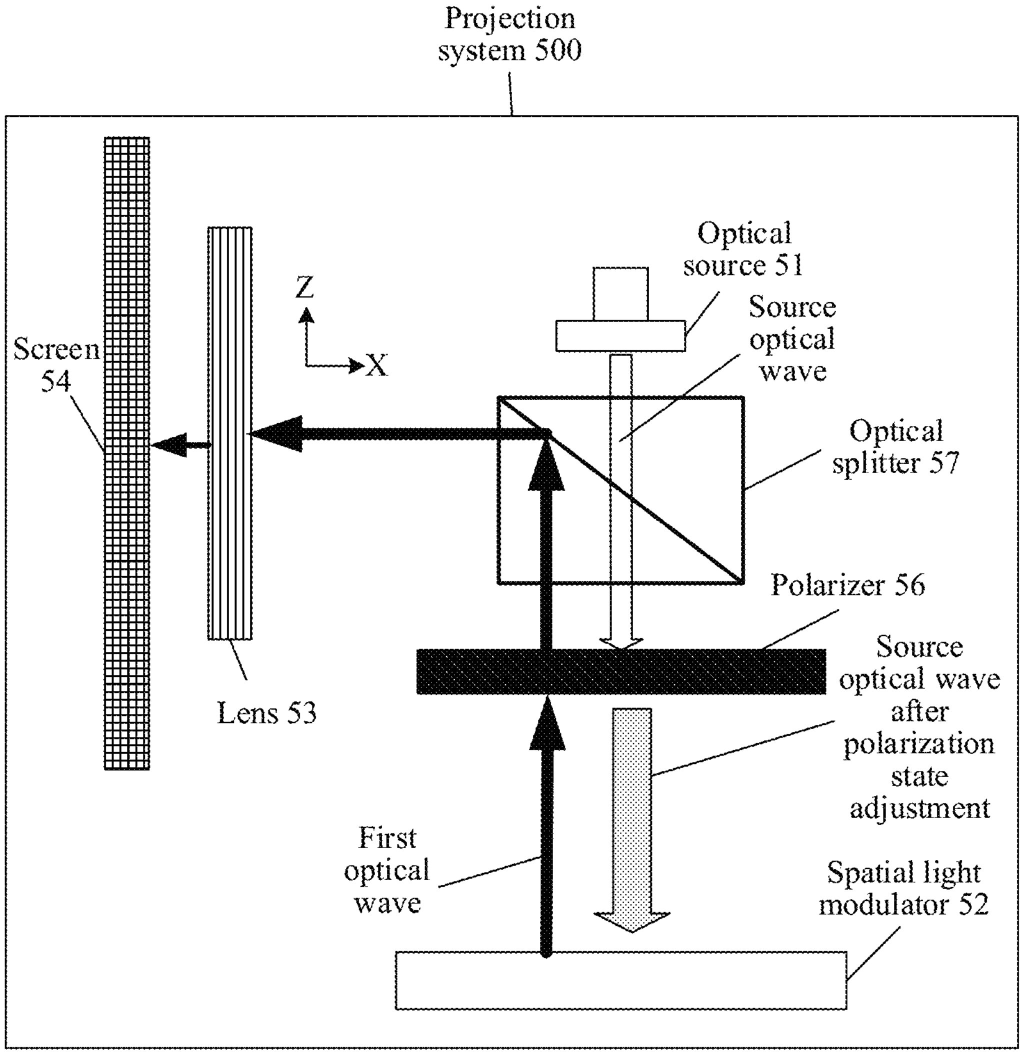
FIG. 27 is another schematic diagram of a structure of a projection system according to an embodiment of this application.

The foregoing describes the structure of the projection system 500 by using a scenario in which the spatial light modulator 52 is the transmissive spatial light modulator as an example. In some actual scenarios, the spatial light modulator 52 may alternatively be the reflective spatial light modulator. When the spatial light modulator 52 is the reflective spatial light modulator, refer to FIG. 27. FIG. 27 is another schematic diagram of a structure of a projection system according to an embodiment of this application. As shown in FIG. 27, the projection system may further include an optical splitter 57, and the optical splitter 57 may be disposed between the optical source 51 and the spatial light modulator 52. The optical splitter 57 is mainly configured to forward, to the spatial light modulator 52, the source optical wave output by the optical source 51, and send, to the lens 53, one or more first optical waves output by the spatial light modulator 52. In other words, the optical splitter 57 can ensure isolation between the optical wave output by the optical source 51 and the optical wave output by the spatial light modulator 52, and ensure that the optical wave output by the optical source 51 is propagated to a position of the spatial light modulator 52, and the optical wave reflected by the spatial light modulator 52 can be propagated to a position of the lens 53.

It should be noted herein that, when the projection system 500 further includes the polarizer 56 and/or the wavelength selective device 55, the optical splitter 57 should be closest to the optical source 51. In other words, the optical wave output by the optical source 51 should first arrive at the optical splitter 57, and then arrive at the spatial light modulator 52 through the polarizer 56 and/or the wavelength selective device 55, and the optical wave reflected by the spatial light modulator 52 should first arrive at the optical splitter 57 through the polarizer 56 and/or the wavelength selective device 55, and then be reflected by the optical splitter 57 to the lens 53.

It should be additionally noted that a material of the substrate layer 526 described above may be silicon, silicon nitride, or the like. The second electrode layer 525 described above is usually made of a transparent material, for example, nitrogen dioxide. When the spatial light modulator 52 is of the transmissive type, a material of the first electrode layer 524 described above may be the same as the material of the second electrode layer 525. When the spatial light modulator 52 is of the reflective type, a material of the spatial light modulator 52 may be metal (such as gold, copper, or aluminum), or may be a reflective structure like a Bragg reflection grating formed by another material. The flat layer (for example, the first flat layer 523, the second flat layer 528, and the third flat layer 5292) described above may be made of silicon dioxide or the like. A material of the phase change material layer 521 described above may be a phase change material like a liquid crystal. A material (which may also be understood as a material of each nano-antenna) of the metasurface layer (for example, the first metasurface layer 522 and the second metasurface layer 5291) described above may be dioxide silicon, silicon, or the like, or may be metal, such as gold, copper, or aluminum.

It should be further noted herein that, in the foregoing embodiment, descriptions of a technical feature in an embodiment may also be applied to explain a corresponding technical feature mentioned in another embodiment. For example, the foregoing describes a plurality of optional structures of the first metasurface layer 522 based on FIG. 16 and FIG. 17. The plurality of optional structures may be descriptions of the first metasurface layer of the spatial light modulator 52 described in FIG. 14, FIG. 15, and other corresponding accompanying drawings. In other words, in the foregoing embodiment, different structures of components or modules in the spatial light modulator 52 may be combined with each other, and different structures corresponding to the projection system 500 may also be combined with each other. Solutions obtained by combining the different structures should all fall within the protection scope of this application.

In the foregoing implementations, the objectives, technical solutions, and beneficial effects of this application are further described in detail. It should be understood that the foregoing descriptions are merely implementations of this application, but are not intended to limit the protection scope of this application. Any modification, equivalent replacement, improvement, or the like made based on the technical solutions of this application shall fall within the protection scope of this application.

The invention claimed is:

1. A spatial light modulator, comprising:

a substrate layer;

a first electrode layer;

a second electrode layer;

a first metasurface layer comprising at least two metasurface units sequentially arranged, wherein a resonance frequency of each of the at least two metasurface units corresponds to a preset incident optical wavelength of each metasurface unit;

a phase change material layer configured to perform first phase modulation on incident light of a first wavelength based on a voltage provided by the first electrode layer and the second electrode layer to obtain a first optical wave, and send the first optical wave to a first metasurface unit in the at least two metasurface units, wherein a preset incident optical wavelength of the first metasurface unit is the first wavelength, wherein the first metasurface unit is configured to perform second phase modulation on the first optical wave to obtain and output a second optical wave;

and a first flat layer, wherein the substrate layer and the first flat layer are parallel to each other, the first electrode layer and the second electrode layer are respectively disposed on opposite sides of the substrate layer and the first flat layer, and the first metasurface layer and the phase change material layer are disposed between the first electrode layer and the second electrode layer.

2. The spatial light modulator according to claim 1, wherein the first metasurface unit comprises a plurality of nano-antennas, and each of the plurality of nano-antennas is in a cylindrical shape; and when a nano-antenna is a dielectric antenna, a diameter of each nano-antenna is greater than or equal to a quarter of the first wavelength and is less than or equal to twice the first wavelength; or when the nano-antenna is a metal antenna, a diameter of each nano-antenna is greater than or equal to one tenth of the first wavelength and is less than or equal to the first wavelength.

3. The spatial light modulator according to claim 1, wherein the first metasurface unit comprises a plurality of nano-antennas, and each of the plurality of nano-antennas is in a cuboid shape; and when a nano-antenna is a dielectric antenna, each side length of each nano-antenna is greater than or equal to a quarter of the first wavelength and is less than or equal to twice the first wavelength; or when the nano-antenna is a metal antenna, each side length of each nano-antenna is greater than or equal to one tenth of the first wavelength and is less than or equal to the first wavelength.

4. The spatial light modulator according to claim 3, wherein the plurality of nano-antennas are sequentially arranged in a first direction, and a long side of each nano-antenna is parallel to an arrangement direction of the at least two metasurface units; and the first direction is perpendicular to the arrangement direction of the at least two metasurface units.

5. The spatial light modulator according to claim 1, wherein the first metasurface unit comprises a plurality of nano-antennas, and each of the plurality of nano-antennas is in an elliptical cylindrical shape;

when a nano-antenna is a dielectric antenna, a length of a major axis and a length of a minor axis of a target cross section of each nano-antenna are greater than or equal to a quarter of the first wavelength and less than or equal to twice the first wavelength; or when the nano-antenna is a metal antenna, a length of a major axis and a length of a minor axis of a target cross section of each nano-antenna are greater than or equal to one tenth of the first wavelength and less than or equal to the first wavelength; and two bottom faces of each nano-antenna are parallel to the first flat layer, and the target cross section of each nano-antenna is a largest cross section of each nano-antenna in an arrangement direction of the at least two metasurface units.

6. The spatial light modulator according to claim 2, wherein a nano-antenna period corresponding to the first metasurface unit is less than or equal to twice the first wavelength.

7. The spatial light modulator according to claim 1, wherein the first electrode layer is a reflective electrode layer or a transmissive electrode layer.

8. The spatial light modulator according to claim 1, wherein the first metasurface layer is comprised on a side of the phase change material layer and that faces the second electrode layer, and is in contact with the second electrode layer; or the first metasurface layer is comprised on a side of the phase change material layer and that faces the first electrode layer, and is in contact with the first electrode layer.

9. The spatial light modulator according to claim 1, wherein the spatial light modulator further comprises a transmission enhancement layer and a second flat layer, the transmission enhancement layer is disposed on a side of the first flat layer and away from the second electrode layer, and the second flat layer is disposed between the phase change material layer and the first electrode layer.

10. The spatial light modulator according to claim 9, wherein the first metasurface layer is comprised on a side of the second flat layer and that faces the phase change material layer, and is in contact with the phase change material layer.

11. The spatial light modulator according to claim 9, wherein the first metasurface layer is comprised on a side of the phase change material layer and that faces the first electrode layer, and is in contact with the second flat layer; or the first metasurface layer is comprised on a side of the phase change material layer and that faces the second electrode layer, and is in contact with the second electrode layer.

12. The spatial light modulator according to claim 9, wherein the second flat layer comprises at least two stacked flat sub-layers, and any two adjacent flat sub-layers in the at least two stacked flat sub-layers have different refractive indexes.

13. The spatial light modulator according to claim 1, wherein the at least two metasurface units further comprise a second metasurface unit, and the first metasurface unit and the second metasurface unit have different widths in an arrangement direction of the at least two metasurface units.

14. The spatial light modulator according to claim 1, wherein the spatial light modulator further comprises a wavelength selective layer, and the wavelength selective layer is disposed on a side of the phase change material layer and that faces away from the substrate layer; and the wavelength selective layer is configured to select the incident light of the first wavelength from incident light of the spatial light modulator, and send the incident light of the first wavelength to a position at the phase change material layer and that corresponds to the first metasurface unit.

15. The spatial light modulator according to claim 14, wherein the wavelength selective layer comprises a third flat layer and a second metasurface layer that are stacked on each other.

16. The spatial light modulator according to claim 1, wherein the spatial light modulator further comprises an orientation layer, and the orientation layer is disposed on a side of the phase change material layer and that faces away from the first metasurface layer, and is in contact with a surface of the phase change material layer and that faces away from the first metasurface layer.

17. The spatial light modulator according to claim 1, wherein the first electrode layer comprises a plurality of first electrodes, the second electrode layer comprises a plurality of second electrodes, the plurality of first electrodes and the plurality of second electrodes form a plurality of electrode pairs, and at least one of the plurality of electrode pairs corresponds to one of the at least two metasurface units.

18. A wavelength selective switch, comprising:

a polarization conversion prism;

a diffraction grating plate;

a reflective lens;

a transmitting lens; and a spatial light modulator, comprising:

a substrate layer;

a first electrode layer;

a second electrode layer;

a first metasurface layer comprising at least two metasurface units that are sequentially arranged, and a resonance frequency of each of the at least two metasurface units corresponds to a preset incident optical wavelength of each metasurface unit;

a phase change material layer configured to perform first phase modulation on incident light of a first wavelength based on a voltage provided by the first electrode layer and the second electrode layer to obtain a first optical wave, and send the first optical wave to a first metasurface unit in the at least two metasurface units, wherein a preset incident optical wavelength of the first metasurface unit is the first wavelength, wherein the first metasurface unit is configured to perform second phase modulation on the first optical wave to obtain and output a second optical wave; and a first flat layer, wherein the substrate layer and the first flat layer are parallel to each other, the first electrode layer and the second electrode layer are respectively disposed on opposite sides of the substrate layer and the first flat layer, and the first metasurface layer and the phase change material layer are disposed between the first electrode layer and the second electrode layer, wherein the polarization conversion prism, the diffraction grating plate, the reflective lens, and the transmitting lens are jointly configured to convert incident light of the wavelength selective switch into a plurality of third optical waves of different wavelengths, and send the plurality of third optical waves to the spatial light modulator configured to perform phase modulation on each of the plurality of third optical waves to obtain a plurality of fourth optical waves, and send the plurality of fourth optical waves to the transmitting lens at different deflection angles, wherein the plurality of fourth optical waves sequentially pass through the transmitting lens, the reflective lens, the diffraction grating plate, and the polarization conversion prism, and are propagated to an outside of the wavelength selective switch as emitted light of the wavelength selective switch.

19. The wavelength selective switch according to claim 18, wherein the first metasurface unit comprises a plurality of nano-antennas, and each of the plurality of nano-antennas is in a cylindrical shape; and when a nano-antenna is a dielectric antenna, a diameter of each nano-antenna is greater than or equal to a quarter of the first wavelength and is less than or equal to twice the first wavelength; or when the nano-antenna is a metal antenna, a diameter of each nano-antenna is greater than or equal to one tenth of the first wavelength and is less than or equal to the first wavelength.

20. The wavelength selective switch according to claim 18, wherein the first metasurface unit comprises a plurality of nano-antennas, and each of the plurality of nano-antennas is in a cuboid shape; and when a nano-antenna is a dielectric antenna, each side length of each nano-antenna is greater than or equal to a quarter of the first wavelength and is less than or equal to twice the first wavelength; or when the nano-antenna is a metal antenna, each side length of each nano-antenna is greater than or equal to one tenth of the first wavelength and is less than or equal to the first wavelength.

* * * * *